(12) United States Patent
Zabic et al.

(10) Patent No.: US 11,481,935 B2
(45) Date of Patent: *Oct. 25, 2022

(54) SYSTEMS AND METHODS FOR ITERATIVE RECONSTRUCTION

(71) Applicant: SHANGHAI UNITED IMAGING HEALTHCARE CO., LTD., Shanghai (CN)

(72) Inventors: Stanislav Zabic, Cleveland, OH (US); Patrick Kling, Cleveland, OH (US); Wenjing Cao, Shanghai (CN); Alexander Zamyatin, Cleveland, OH (US); Zhicong Yu, Cleveland, OH (US); Haohua Sun, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/221,012

(22) Filed: Apr. 2, 2021

(65) Prior Publication Data

US 2021/0225046 A1 Jul. 22, 2021

Related U.S. Application Data

(63) Continuation of application No. 16/206,167, filed on Nov. 30, 2018, now Pat. No. 10,977,840.

(30) Foreign Application Priority Data

Aug. 21, 2018 (CN) .......................... 201810954772.7
Aug. 21, 2018 (CN) .......................... 201810956684.0

(51) Int. Cl.
*G06T 11/00* (2006.01)
*G06T 5/20* (2006.01)

(52) U.S. Cl.
CPC .............. *G06T 11/006* (2013.01); *G06T 5/20* (2013.01); *G06T 2211/421* (2013.01); *G06T 2211/424* (2013.01)

(58) Field of Classification Search
CPC ..................... G06T 11/006; G06T 5/20; G06T 2211/421; G06T 2211/424; G06T 2011/416
See application file for complete search history.

(56) References Cited

U.S. PATENT DOCUMENTS 6,728,566 B1 * 4/2004 Subramanyan ....... G06T 11/005
600/407
8,478,015 B2 * 7/2013 Faul ...................... A61B 6/5235
378/4

(Continued)

FOREIGN PATENT DOCUMENTS

| CN | 101404088 B | 10/2011 |
| CN | 104821003 A | 8/2015 |
| CN | 104240272 B | 3/2017 |

OTHER PUBLICATIONS

Zamyatin, A.A. et al., Extension of the Reconstruction Field of View and Truncation Correction using Sinogram Decomposition, Medical Physics, 34(5): 1593-1604, 2007.

(Continued)

*Primary Examiner* — John J Lee
(74) *Attorney, Agent, or Firm* — Metis IP LLC

(57) ABSTRACT

The disclosure relates to systems and methods for iterative reconstruction. Raw data detected from a plurality of angles by an imaging device may be obtained. A first seed image may be generated by performing a filtered back projection on the raw data. A first air mask may be determined by performing a minimum value back projection (BP) on the raw data. One or more images may be reconstructed by (Continued)

performing an iterative reconstruction based on the first seed image, the first air mask, and the raw data.

20 Claims, 24 Drawing Sheets

(56) References Cited

U.S. PATENT DOCUMENTS

| | | | | |
|---|---|---|---|---|
| 8,731,269 | B2* | 5/2014 | Nakanishi | G06T 11/006 378/4 |
| 2015/0356756 | A1* | 12/2015 | Okamoto | G06T 7/0012 382/131 |

OTHER PUBLICATIONS

Fessler, J.A. et al., Ordered Subsets Algorithms for Transmission Tomography, Physics in Medicine & Biology, 44(11): 2835-2851, 1999.

Karl, Stierstorfer et al., Weighted FBP-A Simple Approximate 3D FBP Algorithm for Multislice Spiral CT with Good does Usage for Arbitrary Pitch, Physics in Medicine AND Biology, 49(11): 2209-2218, 2004.

\* cited by examiner

2200

```
┌─────────────────────────────────────────────────────────────┐
│ Generating one or more rotated circular images by rotating the │  2201
│ multiple third elements of the preliminary circular image with respect │
│ to a center of the outer ring for one or more times and by an angle in │
│ each time of rotation │
└─────────────────────────────────────────────────────────────┘
                              │
                              ▼
┌─────────────────────────────────────────────────────────────┐
│ Generating a superposed image by superimposing the preliminary │  2203
│ circular image and the one or more rotated circular images │
└─────────────────────────────────────────────────────────────┘
                              │
                              ▼
┌─────────────────────────────────────────────────────────────┐
│ Generating the background image corresponding to the outer ring │  2205
│ background by normalizing the superposed image │
└─────────────────────────────────────────────────────────────┘
```

FIG. 22

SYSTEMS AND METHODS FOR ITERATIVE RECONSTRUCTION

CROSS-REFERENCE TO RELATED APPLICATIONS

This application is a continuation of U.S. patent application Ser. No. 16/206,167, filed on Nov. 30, 2018, which claims priority to Chinese Patent Application No. 201810954772.7, filed on Aug. 21, 2018, and Chinese Patent Application No. 201810956684.0, filed on Aug. 21, 2018, the contents of which are hereby incorporated by reference in its entirety.

TECHNICAL FIELD

The present disclosure generally relates to image reconstruction, and more specifically relates to systems and methods for iterative reconstruction.

BACKGROUND

Non-invasive imaging technologies can obtain image data of internal structures of a subject without performing an invasive procedure on the subject. The imaging technologies such as computed tomography (CT), positron emission tomography (PET), magnetic resonance imaging (MRI) exploit various physical principles to acquire image data and provide images of the subject. One of image reconstruction approaches is iterative reconstruction. Iterative reconstruction refers to a technique that forms an image by repeatedly adjusting an existing estimate according to the quality of a match between measured data and simulated measurements from a current estimate of the image. However, the iterative reconstruction technique is generally computationally intensive and time consuming. Slow reconstruction speed is one of the greatest challenges of iterative reconstruction. Thus, it is desirable to accelerate the iterative reconstruction.

SUMMARY

In one aspect of the present disclosure, a method is provided. The method may be implemented on at least one machine each of which has at least one processor and at least one storage device for reconstructing one or more images. Each image of the one or more images may include a plurality of elements. Each element of the plurality of elements may be a pixel or voxel. The method may include one or more of the following operations: obtaining raw data detected from a plurality of angles by an imaging device; generating a first seed image by performing a filtered back projection on the raw data; determining a first air mask by performing a minimum value back projection (BP) on the raw data; and/or reconstructing one or more images by performing an iterative reconstruction based on the first seed image, the first air mask, and the raw data.

In some embodiments, the one or more images may include a 3D image or an image volume.

In some embodiments, the first air mask may include one or more elements having zero attenuation for a radiation ray in the imaging device.

In some embodiments, the determination of a first air mask by performing a minimum value BP on the raw data may include one or more of the following operations: for each element of the one or more images, performing the minimum value BP by designating a substantially minimal raw datum among a portion of the raw data or modified data as a back projection value of the each element, the portion of the raw data being associated with the each element and detected from the plurality of angles, the modified data being generated by interpolation based on the raw data; generating a second seed image based on a plurality of back projection values associated with the plurality of elements; and/or generating the first air mask by performing thresholding on the second seed image based on a second threshold.

In some embodiments, the raw data may be detected by a plurality of detectors of the imaging device, the plurality of detectors may be arranged in a channel direction and a row direction, and the determination of a first air mask by performing a minimum value BP on the raw data may further include one or more of the following operations: performing a one dimensional (1D) low-pass filtering on the raw data in the channel direction before performing the minimum value BP.

In some embodiments, the raw data may correspond to a sinogram, and the determination of a first air mask by performing a minimum value BP on the raw data may further include one or more of the following operations: performing a two dimensional (2D) low-pass filtering on the raw data before performing the minimum value BP.

In some embodiments, the determination of a first air mask by performing a minimum value BP on the raw data may further include one or more of the following operations: generating a second air mask by performing thresholding on the first seed image based on a third threshold; and/or modifying the first air mask by performing a Boolean operation based on the first air mask and the second air mask.

In some embodiments, the determination of a first air mask by performing a minimum value BP on the raw data may further include one or more of the following operations: modifying the first seed image by at least one of subtracting an outer ring background from the first seed image or performing a 2D low-pass filtering on the first seed image; generating a second air mask by performing thresholding on the modified first seed image based on a third threshold; and/or modifying the first air mask by performing a Boolean operation based on the first air mask and the second air mask.

In some embodiments, the determination of a first air mask by performing a minimum value BP on the raw data may further include: performing a morphological operation on the modified first air mask.

In some embodiments, the first air mask may be determined according to a plurality of pixel tiles, wherein each of the plurality of pixel tiles may include N×M pixels.

In some embodiments, the iterative reconstruction may include a plurality of forward projections and a plurality of back projections, and the first air mask may be used in the plurality of forward projections and the plurality of back projections.

In some embodiments, the method may further include: updating the first air mask in one or more iterations of the iterative reconstruction.

In some embodiments, the method may further include: modifying the first seed image by subtracting an outer ring background from the first seed image.

In another aspect of the present disclosure, a method is provided. The method may be implemented on at least one machine each of which has at least one processor and at least one storage device for reconstructing one or more images. The method may include one or more of the following operations: obtaining raw data detected by an imaging device; generating a seed image by performing a filtered back projection on the raw data; determining a corrected seed image by subtracting an outer ring background from the seed image, the outer ring background indicating a background of an outer ring, the outer ring corresponding to a region between a field of view (FOV) of the imaging device and a gantry bore of the imaging device; and/or reconstructing one or more images by performing an iterative reconstruction based on the corrected seed image and the raw data.

In some embodiments, the seed image may include a plurality of first elements in a Cartesian coordinate system, each first element may be a pixel or voxel, and the determination of a corrected seed image by subtracting an outer ring background from the seed image may include one or more of the following operations: determining an intermediate image including a plurality of second elements in a polar coordinate system by performing a first coordinate transformation of the seed image from the Cartesian coordinate system to the polar coordinate system; extracting, from the plurality of second elements in the polar coordinate system, multiple second elements corresponding to the outer ring; dividing, based on locations of the multiple extracted second elements in the polar coordinate system, the multiple extracted second elements into a plurality of groups, each group of extracted second elements corresponding to a sub-region of the outer ring; generating a background image corresponding to the outer ring background in the Cartesian coordinate system based on the plurality of groups of extracted second elements; and/or subtracting the background image corresponding to the outer ring background from the seed image to obtain the corrected seed image.

In some embodiments, the generation of a background image corresponding to the outer ring background in the Cartesian coordinate system based on the plurality of groups of extracted second elements may include one or more of the following operations: determining a plurality of reference values in each sub-region of the outer ring along a radial direction of the polar coordinate system; determining a preliminary circular image including multiple third elements in the Cartesian coordinate system by performing a second coordinate transformation of the multiple extracted second elements from the polar coordinate system to the Cartesian coordinate system, the preliminary circular image corresponding to the outer ring; and/or modifying the preliminary circular image to obtain the background image corresponding to the outer ring background by performing a homogenization operation.

In some embodiments, the performing a second coordinate transformation of the multiple extracted second elements from the polar coordinate system to the Cartesian coordinate system may further include: performing, based on the plurality of reference values, interpolation for the multiple transformed extracted second elements.

In some embodiments, the multiple extracted second elements may be distributed in a plurality of rows along the radial direction of the polar coordinate system, and the determination of a plurality of reference values in each sub-region of the outer ring along the radial direction of the polar coordinate system may include one or more of the following operations: for each sub-region of the outer ring and in each row of the plurality of rows, designating a median value of the extracted second elements in the each row of the each sub-region as a reference value of the each row of the each sub-region; or determining a portion of the extracted second elements in the each row of the each sub-region, and designating an average value of the portion of the extracted second elements as a reference value of the each row of the each sub-region, the portion of the extracted second elements having element values within a certain range.

In some embodiments, the modification of the preliminary circular image to obtain the background image corresponding to the outer ring background by performing a homogenization operation may include one or more of the following operations: generating one or more rotated circular images by rotating the multiple third elements of the preliminary circular image with respect to a center of the outer ring for one or more times and by an angle in each time of rotation; generating a superposed image by superimposing the preliminary circular image and the one or more rotated circular images; and/or generating the background image corresponding to the outer ring background by normalizing the superposed image.

In some embodiments, the modification of the preliminary circular image to obtain the background image corresponding to the outer ring background by performing a homogenization operation may include one or more of the following operations: rotating the multiple third elements of the preliminary circular image for one or more times, wherein in each time of rotation, generating a rotated circular image upon rotating the multiple third elements of the preliminary circular image with respect to a center of the outer ring by an angle; generating a superposed image by superimposing the preliminary circular image and the rotated circular image; and designating the superposed image as the preliminary circular image; and generating the background image corresponding to the outer ring background by normalizing the superposed image.

In some embodiments, the method may further include: performing an interpolation operation for at least one of the one or more rotated circular images before generating the superposed image.

In some embodiments, the method may further include: performing an interpolation operation for at least one of the one or more rotated circular images before generating the superposed image.

In some embodiments, the generation of a seed image may include one or more of the following operations: generating a preliminary image by performing a filtered back projection on the raw data; and/or determining the seed image by performing a down-sampling on the preliminary image.

In some embodiments, the generation of a seed image may include one or more of the following operations: performing a down-sampling on the raw data; and/or generating the seed image by performing a filtered back projection on the down-sampled raw data.

In some embodiments, the raw data may be collected from a plurality of angles, and the generation of a seed image may include one or more of the following operations: selecting, from the raw data, a portion of the raw data that are collected from a portion of the plurality of angles; and/or generating the seed image by performing a filtered back projection on the selected portion of the raw data.

In some embodiments, the seed image may include a plurality of elements, each element of the plurality of elements may be a pixel or voxel, and the determination of a corrected seed image by subtracting an outer ring background from the seed image may include one or more of the following operations: extracting, from the plurality of elements, multiple elements corresponding to a preliminary circular image of the outer ring; generating one or more rotated circular images by rotating the multiple extracted elements with respect to a center of the outer ring for one or more times and by an angle in each time of rotation, the angle being less than 360°; generating a background image corresponding to the outer ring background based on the preliminary circular image and the one or more rotated circular images; and/or subtracting the background image corresponding to the outer ring background from the seed image to obtain the corrected seed image.

In some embodiments, the generation of a background image of the outer ring background based on the preliminary circular image and the one or more rotated circular image may include one or more of the following operations: generating a superposed image by superimposing the preliminary circular image and the one or more rotated circular images; and/or generating the background image corresponding to the outer ring background by normalizing the superposed image.

In some embodiments, the method may further include: modifying at least one of the one or more rotated circular images by interpolation.

In yet another aspect of the present disclosure, a system is provided. The system may include at least one processor; and a storage configured to store instructions. When executing the instructions, the at least one processor may be configured to cause the system to: obtain raw data detected from a plurality of angles by an imaging device; generate a first seed image by performing a filtered back projection on the raw data; determine a first air mask by performing a minimum value back projection (BP) on the raw data; and/or reconstruct one or more images by performing an iterative reconstruction based on the first seed image, the first air mask, and the raw data.

In yet another aspect of the present disclosure, a system is provided. The system may include: at least one processor; and a storage configured to store instructions. When executing the instructions, the at least one processor may be configured to cause the system to: obtain raw data detected by an imaging device; generate a seed image by performing a filtered back projection on the raw data; determine a corrected seed image by subtracting an outer ring background from the seed image, the outer ring background indicating a background of an outer ring, the outer ring corresponding to a region between a field of view (FOV) of the imaging device and a gantry bore of the imaging device; and/or reconstruct one or more images by performing an iterative reconstruction based on the corrected seed image and the raw data.

In yet another aspect of the present disclosure, a non-transitory computer readable medium is provided. The non-transitory computer readable medium may store instructions. The instructions, when executed by at least one processor, may cause the at least one processor to implement a method including: obtaining raw data detected from a plurality of angles by an imaging device; generating a first seed image by performing a filtered back projection on the raw data; determining a first air mask by performing a minimum value back projection (BP) on the raw data; and/or reconstructing one or more images by performing an iterative reconstruction based on the first seed image, the first air mask, and the raw data.

In yet another aspect of the present disclosure, a non-transitory computer readable medium is provided. The non-transitory computer readable medium may store instructions. The instructions, when executed by at least one processor, may cause the at least one processor to implement a method comprising: obtaining raw data detected by an imaging device; generating a seed image by performing a filtered back projection on the raw data; determining a corrected seed image by subtracting an outer ring background from the seed image, the outer ring background indicating a background of an outer ring, the outer ring corresponding to a region between a field of view (FOV) of the imaging device and a gantry bore of the imaging device; and/or reconstructing one or more images by performing an iterative reconstruction based on the corrected seed image and the raw data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 22 is a flowchart illustrating an exemplary process for modifying a preliminary circular image according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
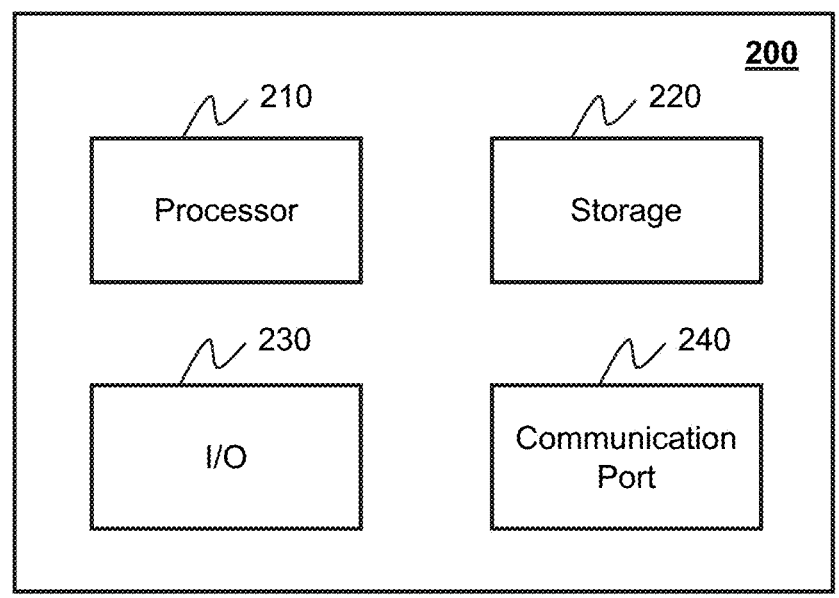
FIG. 2 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for acceleration of iterative reconstruction. One or more images may be generated by performing an iterative reconstruction. Each of the one or more images may include a plurality of elements. An element may be a pixel or voxel. To accelerate the iterative reconstruction, the systems and methods may generate an air mask including only elements representing air. The elements representing air may be omitted in the iterative reconstruction, which may accelerate the iterative reconstruction. To generate the air mask, the systems and methods may obtain raw data detected by an imaging device and from a plurality of angles. The systems and methods may perform minimum value back projection (BP) by designating a substantially minimal raw datum among a portion of the raw data or modified data as a back projection value of each element of the one or more images, and generate an air mask seed image (or a second seed image) based on a plurality of back projection values associated with the plurality of elements. The systems and methods may generate the air mask (also referred to herein as a first air mask) by performing thresholding on the air mask seed image (or the second seed image) based on a threshold. To perform the iterative reconstruction, the systems and methods may further generate a seed image (also referred to herein as an initial image estimate) by performing a filtered back projection (FBP) on the raw data. The systems and methods may generate one or more images by performing an iterative reconstruction based on the seed image (or the initial image estimate), the air mask (or the first air mask), and the raw data.

Alternatively or additionally, in general, a seed image (i.e., an initial image estimate) may include a shift due to lack of data in the outer ring. To compensate the shift, a larger iteration count of iterative reconstruction may need to be performed. However, the systems and methods as disclosed herein may accelerate the iterative reconstruction (i.e., reducing the iteration count of iterative reconstruction) by generating a corrected seed image. The systems and methods may determine the corrected seed image by subtracting an outer ring background from the seed image. The outer ring background may correspond to a background of an outer ring. The outer ring may correspond to a region between a (scanned) field of view (FOV) and a gantry bore of the imaging device. The systems and methods may generate one or more images by performing an iterative reconstruction based on the corrected seed image and the raw data.

Figure 1:
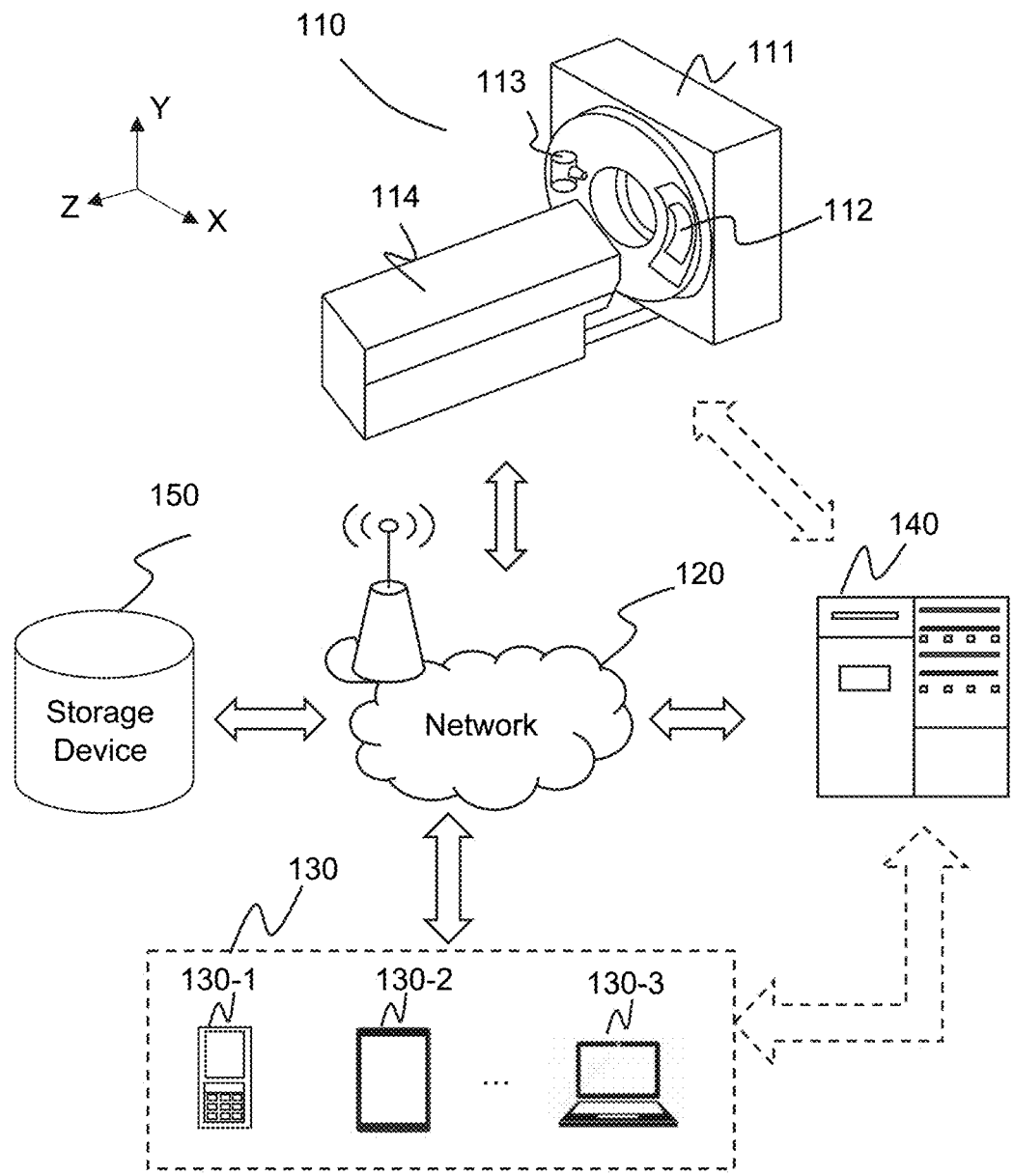
FIG. 1 is a schematic diagram illustrating an exemplary imaging system according to some embodiments of the present disclosure.

FIG. 1 is a schematic diagram illustrating an exemplary imaging system according to some embodiments of the present disclosure. The imaging system 100 may include a computed tomography (CT) system, a computed tomography angiography (CTA) system, a positron emission tomography (PET) system, a single photon emission computed tomography (SPECT) system, a magnetic resonance imaging (MRI) system, or the like, or a combination thereof. In some embodiments, the medical imaging system may be solely used. In some embodiments, the medical imaging system may be used with a multi-modality system (e.g., a PET-CT system).

As illustrated in FIG. 1, the imaging system 100 may include an imaging device 110, a network 120, one or more terminals 130, a processing device 140, and a storage device 150. The components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

Taking a CT system as an example, the imaging device 110 may include a gantry 111, a detector module 112, a radiation source 113, and a scanning table 114. The detector module 112 and the radiation source 113 may be oppositely mounted on the gantry 111. A subject may be placed on the scanning table 114 and moved into a detection tunnel of the imaging device 110. The subject may be a biological subject (e.g., a patient, an animal) or a non-biological subject (e.g., a human-made subject). In the present disclosure, "subject" and "object" are used interchangeably. For illustration purposes, a coordinate system as shown in FIG. 1 is introduced. The coordinate system may include an X-axis, a Y-axis, and a Z-axis. The Z-axis may refer to a direction along which the object is moved into and/or out of the detection tunnel of the imaging device 110. The X-axis and the Y-axis may form a plane perpendicular to the Z-axis.

The radiation source 113 may emit radiation rays to scan a subject that is placed on the scanning table 114. The radiation rays may include X-rays, y-rays, a-rays, ultraviolet, laser, neutron, proton, or the like, or a combination thereof. The detector module 112 may receive the radiation rays passed through the subject. In some embodiments, the detector module 112 may include a plurality of detectors, which may be arranged in a channel direction and a row direction. The detector may include a scintillation detector (e.g., a cesium iodide detector) or a gas detector.

The network 120 may facilitate exchange of information and/or data. In some embodiments, one or more components of the imaging system 100 (e.g., the imaging device 110, the terminal 130, the processing device 140, or the storage device 150) may send information and/or data to another component(s) in the imaging system 100 via the network 120. For example, the processing device 140 may obtain, via the network 120, raw data related to a subject from the imaging device 110. As another example, the processing device 140 may obtain, via the network 120, user instruction(s) for generating an air mask, correcting a seed image, reconstructing one or more images, etc. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the imaging system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the imaging device 110. In some embodiments, the terminal 130 may operate the imaging device 110 via a wireless connection. In some embodiments, the terminal 130 may receive information and/or instructions inputted by a user, and send the received information and/or instructions to the imaging device 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

In some embodiments, the processing device 140 may process data obtained from the imaging device 110, the terminal 130, or the storage device 150. For example, the processing device 140 may generate a seed image and/or an air mask based on raw data detected by the imaging device 110. As another example, the processing device 140 may correct the seed image to determine a corrected seed image. As a further example, the processing device 140 may reconstruct one or more images by performing an iterative reconstruction based on user instruction(s) obtained from the terminal 130. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local or remote. For example, the processing device 140 may access information and/or data stored in the imaging device 110, the terminal 130, and/or the storage device 150 via the network 120. As another example, the processing device 140 may be directly connected to the imaging device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the terminal 130, the processing device 140). One or more components of the imaging system 100 may access the data or instructions stored in the storage device 150 via the network 120. In some embodiments, the storage device 150 may be directly connected to or communicate with one or more components of the imaging system 100 (e.g., the terminal 130, the processing device 140). In some embodiments, the storage device 150 may be part of the processing device 140.

FIG. 2 is a schematic diagram illustrating exemplary hardware and/or software components of a computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the imaging device 110, the terminal 130, the storage device 150, and/or any other component of the imaging system 100. For example, the processor 210 may generate an air mask based on raw data detected by the imaging device 110. As another example, the processor 210 may correct a seed image by subtracting an outer ring background from the seed image. As a further example, the processor 210 may reconstruct one or more images by performing an iterative reconstruction. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the imaging device 110, the terminal 130, the storage device 150, or any other component of the imaging system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program (e.g., in the form of computer-executable instructions) for the processing device 140 for generating an air mask. As another example, the storage 220 may store a program (e.g., in the form of computer-executable instructions) for the processing device 140 for correcting a seed image. As a further example, the storage 220 may store a program (e.g., in the form of computer-executable instructions) for the processing device 140 for reconstructing one or more images by performing an iterative reconstruction.

The I/O 230 may input or output signals, data, and/or information. In some embodiments, the I/O 230 may enable a user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the imaging device 110, the terminal 130, or the storage device 150. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
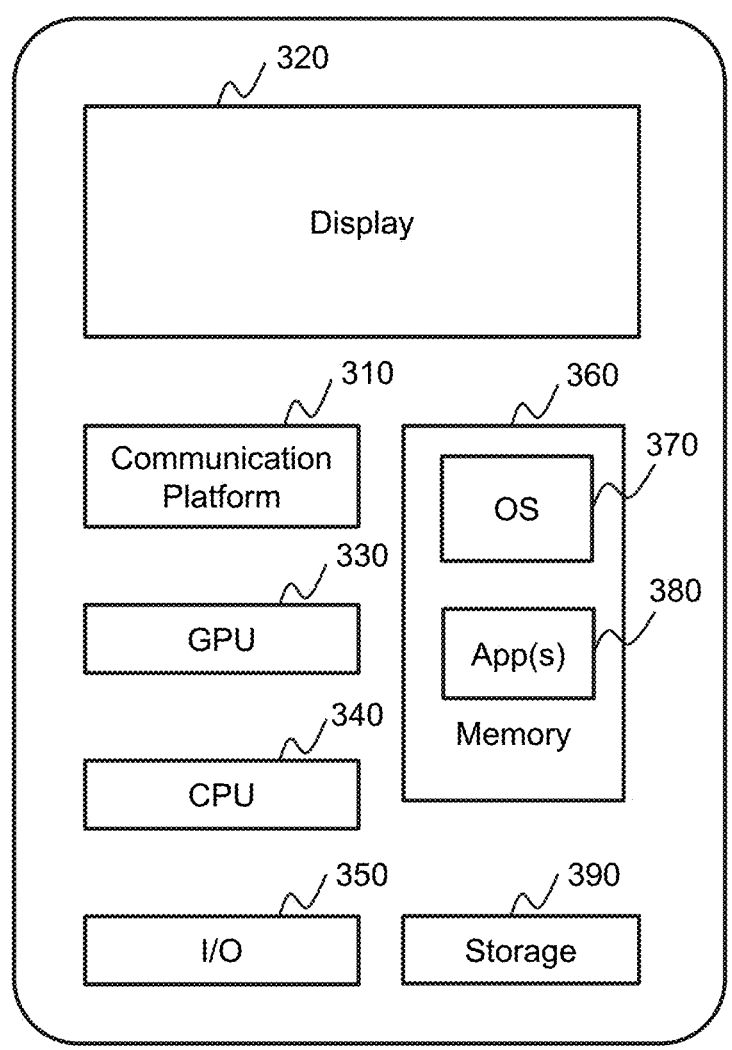
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to accelerate of iterative reconstruction as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
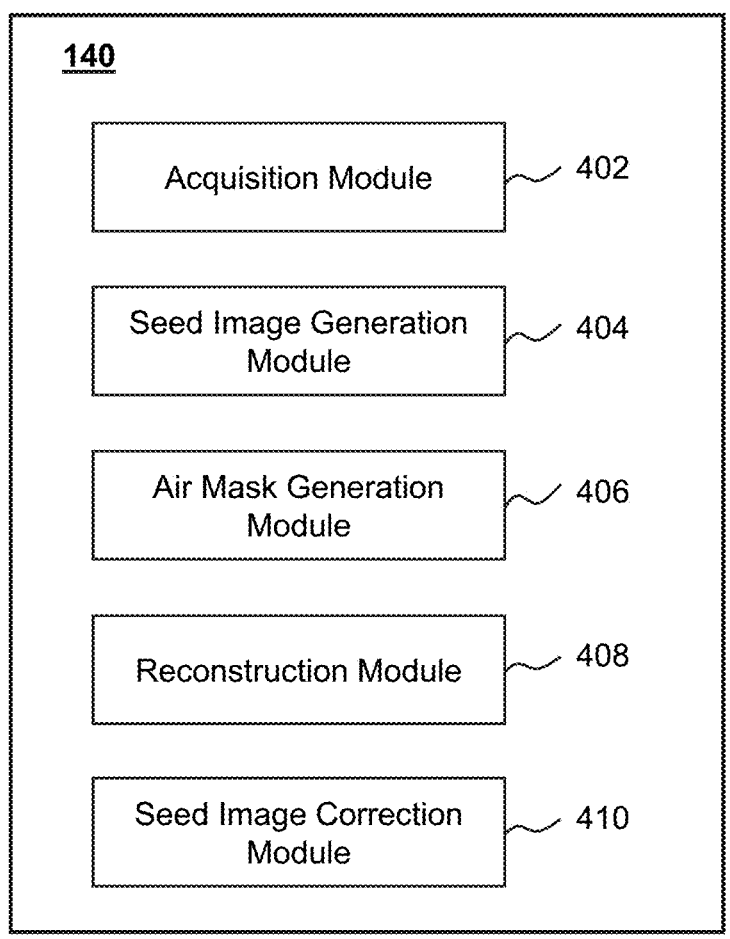
FIG. 4 is a block diagram illustrating an exemplary processing device according to some embodiments of the present disclosure.

FIG. 4 is a schematic diagram illustrating an exemplary processing device according to some embodiments of the present disclosure. The processing device 140 may be implemented on the computing device 200 (e.g., the processor 210 as illustrated in FIG. 2 or the CPU 340 as illustrated in FIG. 3). The processing device 140 may include an acquisition module 402, a seed image generation module 404, an air mask generation module 406, a reconstruction module 408, and a seed image correction module 410.

The acquisition module 402 may be configured to obtain information related to the imaging system 100. The information may include scan data (e.g., raw data), image data, or the like, or any combination thereof. For example, the acquisition module 402 may obtain raw data detected from a plurality of angles by an imaging device (e.g., the imaging device 100). The raw data may reflect attenuation information of radiation rays (e.g., X-rays) that pass through a subject, and may be generally used to generate one or more images related to the subject. The raw data may include a plurality of sets of data corresponding to the plurality of angles. Each set of raw data collected under an angle may also be referred to as a view. In some embodiments, the acquisition module 402 may obtain the raw data from one or more components of the imaging system 100, such as the imaging device 100, a terminal (e.g., the terminal 130), a storage device (e.g., the storage device 150), or the like. Alternatively or additionally, the acquisition module 402 may obtain the raw data from an external source via the network 120. For example, the acquisition module 402 may obtain the raw data from, for example, a medical database, etc.

The seed image generation module 404 may be configured to generate a seed image (also referred to as a first seed image). In some embodiments, the first seed image may provide an initial image estimate for iterative reconstruction. In some embodiments, the seed image generation module 404 may generate the first seed image by performing a filtered back projection (FBP) on the raw data obtained by the acquisition module 402. In an exemplary FBP operation, the seed image generation module 404 may perform filtering on one or more sets (e.g., each set) of the raw data. In some embodiments, the filtering may be performed using, for example, a high-pass filter, a slope filter, or the like, or any combination thereof. In some embodiments, each set of raw data (also referred to as each view) may be convolved with a filter kernel to generate a filtered view. The seed image generation module 404 may perform back projection on the plurality of filtered views to reconstruct the first seed image.

The air mask generation module 406 may be configured to generate an air mask (also referred to as a first air mask). The first air mask may be used to distinguish element(s) representing air and/or element(s) not representing air in an image. In some embodiments, the air mask generation module 406 may determine the first air mask by performing minimum value back projection (BP) on the raw data obtained by the acquisition module 402. Specifically, the air mask generation module 406 may perform minimum value BP for each element of an image to determine a back projection value associated with the each element of the image. The each element of the image may refer to each element of the image to be reconstructed and may correspond to a spatial point of the subject. The air mask generation module 406 may generate a second seed image (also referred to as an air mask seed image) based on a plurality of back projection values associated with the plurality of elements corresponding to a plurality of spatial points of the subject. The air mask generation module 406 may further generate the first air mask by performing thresholding on the second seed image based on a threshold (i.e., the second threshold). Details regarding the generation of the first air mask may be found elsewhere in the present disclosure (e.g., FIG. 6 and the descriptions thereof).

In some embodiments, the air mask generation module 406 may also be configured to modify the first air mask. For example, the air mask generation module 406 may modify the first air mask by performing a logic operation (also referred to as a Boolean operation) based on the first air mask and a second air mask. Specifically, the air mask generation module 406 may perform an "OR" operation and/or an "AND" operation on the first air mask and the second air mask to modify the first air mask. In some embodiments, the second air mask may be generated by performing thresholding on the first seed image based on a threshold (i.e., the third threshold). In some embodiments, the second air mask may be different from the first air mask. In some embodiments, the second air mask may be used to modify the first air mask. As another example, the air mask generation module 406 may modify the first air mask by performing a morphological operation on the first air mask. The morphological operation may include an erosion operation, a dilation operation, an opening operation, a closing operation, or the like, or any combination thereof. Details regarding the modification of the first air mask may be found elsewhere in the present disclosure (e.g., FIG. 9 and the descriptions thereof).

The reconstruction module 408 may be configured to reconstruct one or more images by performing an iterative reconstruction. Exemplary iterative reconstruction algorithms may include an adaptive statistical iterative reconstruction (ASiR), a model based iterative reconstruction (MBiR), an iterative reconstruction in image space (iRIS), a sinogram affirmed iterative reconstruction (SAFIRE), a double model based iterative reconstruction (DMBiR), an adaptive iterative dose reduction (AIDR), IMR, or the like, or any combination thereof. In some embodiments, the reconstruction module 408 may reconstruct one or more images by performing an iterative reconstruction based on the first seed image, the first air mask, and/or the raw data. Alternatively, the reconstruction module 408 may reconstruct one or more images by performing an iterative reconstruction based on a corrected seed image and the raw data.

Details regarding the reconstruction of image(s) may be found elsewhere in the present disclosure (e.g., operation 507 of the process 500, operation 1407 of the process 1400, and the descriptions thereof).

The seed image correction module 410 may be configured to correct and/or modify a seed image (e.g., the first seed image) to determine a corrected seed image. In some embodiments, the seed image correction module 410 may perform a low-pass filtering on the seed image (e.g., the first seed image). For example, the seed image correction module 410 may perform a 2D low-pass filtering on the first seed image. As another example, the seed image correction module 410 may perform a 1D low-pass filtering in the channel direction of a plurality of detectors of the detector module 112. Alternatively or additionally, the seed image correction module 410 may subtract an outer ring background from the seed image (e.g., the first seed image) to determine a corrected seed image. The outer ring background may correspond to a background of an outer ring. The outer ring may correspond to a region between a (scanned) field of view (FOV) of the imaging device 110 and a gantry bore of the imaging device 110. Details regarding the correction of the seed image may be found elsewhere in the present disclosure (e.g., operation 901 of the process 900, operation 1405 of the process 1400, the process 1600, and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 4). The storage module may be configured to store data generated by the processing device 140. In some embodiments, two or more of the modules (or units) may be combined into a single module (or unit). For example, the seed image generation module 404 and the seed image correction module 410 may be combined into a single module. The single module may be configured to generate and/or modify the seed image. Alternatively or additionally, any one of the modules may be divided into two or more units (or sub-units). For example, the air mask generation module 406 may be divided into two units. One of the units may be configured to generate an air mask (e.g., a first air mask), and the other may be configured to modify the air mask (e.g., the first air mask).

Figure 5:
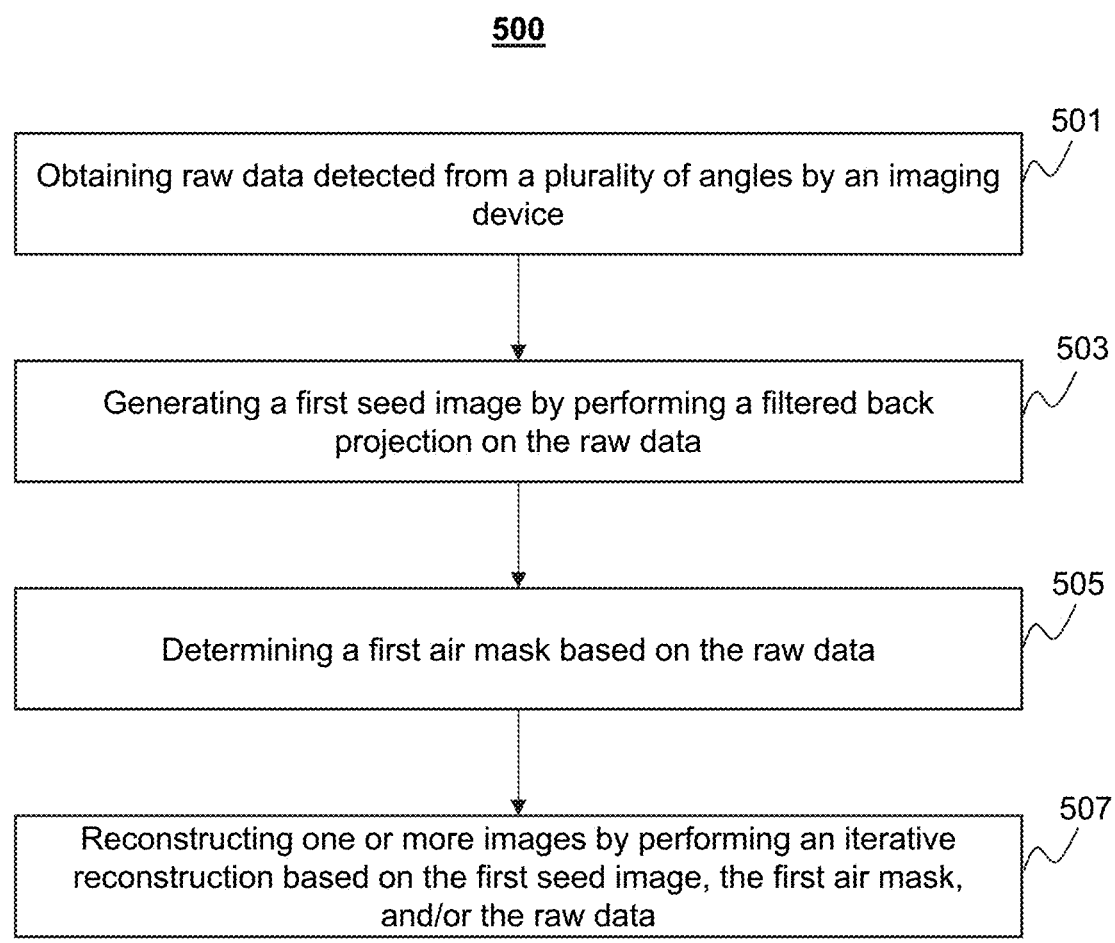
FIG. 5 is a flowchart illustrating an exemplary process for generating one or more images according to some embodiments of the present disclosure.

FIG. 5 is a flowchart illustrating an exemplary process for reconstructing one or more images according to some embodiments of the present disclosure. In some embodiments, one or more operations of process 500 may be implemented in the imaging system 100 illustrated in FIG. 1. For example, the process 500 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 500 may be implemented on the imaging device 110. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 501, the processing device 140 (e.g., the acquisition module 402) may obtain raw data detected from a plurality of angles (also referred to herein as projection angles) by an imaging device (e.g., the imaging device 110). In some embodiments, the raw data may be referred to as projection data. The raw data may reflect attenuation information of radiation rays (e.g., X-rays) that pass through a subject, and may be generally used to generate one or more images related to the subject. In some embodiments, the raw data may be detected and/or collected by the imaging device 110 at a plurality of angles. The raw data may include a plurality of sets of data corresponding to the plurality of angles. In some embodiments, each set of raw data collected under an angle may also be referred to as a view. For example, the imaging device 110 (e.g., a CT imaging device) may perform a scan of the subject by irradiating the subject with X-rays. During the scan, the radiation source 113 and the detector module 112 may rotate with the gantry 111 around the Z-axis to scan the subject from different angles. The Z-axis may be from the front side to the rear side of the gantry 111 along the axis of a scanning channel of the gantry 111.

In some embodiments, the projection angle may refer to an angle formed by the line connecting the radiation source 113 and the rotation center of the gantry 111 and a coordinate system (e.g., the X-axis, the Y-axis as illustrated in FIG. 1). In some embodiments, the angle may range from a start angle and a stop angle. The start angle may correspond to a position of the radiation source 113 at which the radiation source 113 starts to emit radiation rays and the detector module 112 starts to detect the raw data. The stop angle may correspond to a position of the radiation source 113 at which the radiation source 113 stops emitting radiation rays and the detector module 112 stops detecting the raw data. The start angle may be, for example, 0°, 5°, 10°, 20°, etc. The stop angle may be larger than the start angle, for example, 180°, 210°, 270°, 360°, etc. In some embodiments, the radiation source 113 may emit radiation rays (e.g., X-rays) toward the subject continuously when the gantry 111 rotates. In some embodiments, a plurality of sets of raw data corresponding to a plurality of angles (e.g., 1,200 or 2,400 angles ranging from 0° to 360°) may be collected by the detector module 112. Alternatively, the radiation source 113 may emit radiation rays (e.g., X-rays) toward the subject intermittently when the gantry 111 rotates. In some embodiments, the radiation source 113 may emit radiation rays (e.g., X-rays) toward the subject at a certain angle interval (e.g., 1°, 2°, 5°, 10°, etc.). For example, the angle interval may be 1° and the angle range may be 0°-360°, and accordingly, 360 sets of raw data (also referred to as 360 views) may be collected by the detector module 112. As another example, the angle interval may be 0.5° and the angle range may be 0°-360°, and accordingly, 720 sets of raw data (also referred to as 720 views) may be collected by the detector module 112.

In some embodiments, the acquisition module 402 may obtain the raw data from one or more components of the imaging system 100, such as the imaging device 110, a terminal (e.g., the terminal 130), a storage device (e.g., the storage device 150), or the like. Alternatively or additionally, the acquisition module 402 may obtain the raw data from an external source via the network 120. For example, the acquisition module 402 may obtain the raw data from, for example, a medical database, etc.

In 503, the processing device 140 (e.g., the seed image generation module 404) may generate a first seed image. In some embodiments, the seed image generation module 404 may generate the first seed image by performing a filtered back projection (FBP) on the raw data obtained in 501. In some embodiments, the FBP may refer to a technique of reconstructing images from raw data (or projection data) by processing data in the projection space, and then determining a value of each element in the image space (also referred to herein as image element) as a linear combination of a portion of the processed data. The portion of the processed data may be acquired from a plurality of points in projection space to which the image element contributes in forward projection. An image element may be a pixel or voxel that corresponds to a spatial point of the subject. The value of an image element may be a datum associated with attenuation coefficients of radiation rays (e.g. X-rays) that pass through the corresponding spatial point of the subject from the plurality of angles.

In an exemplary FBP operation, the seed image generation module 404 may perform filtering on one or more sets (e.g., each set) of the raw data. In some embodiments, the filtering may be performed using, for example, a high-pass filter, a slope filter, or the like, or any combination thereof. In some embodiments, each set of raw data (also referred to as each view) may be convolved with a filter kernel to generate a filtered view. The seed image generation module 404 may perform back projection on the plurality of filtered views to reconstruct the first seed image.

In some embodiments, the first seed image may be further modified and/or corrected to determine a modified first seed image. In some embodiments, the seed image correction module 410 may perform low-pass filtering on the first seed image. Alternatively or additionally, the seed image correction module 410 may modify and/or correct the first seed image by subtracting an outer ring background from the first seed image. More descriptions regarding the modification and/or correction of first seed image may be found elsewhere in the present disclosure (e.g., operation 901 of process 900, operation 1405 of process 1400, process 1600, and the relevant descriptions thereof).

In 505, the processing device 140 (e.g., the air mask generation module 406) may determine a first air mask based on the raw data obtained in 501. In some embodiments, an air mask may include one or more elements having zero attenuation for radiation rays (e.g., the X-rays). The elements having zero attenuation or relatively low (e.g., negligible) attenuation for radiation rays may represent air. Each of the one or more elements may be a pixel or voxel. The first air mask may be used to distinguish elements representing air and elements not representing air in an image (e.g., the first seed image determined in 503). The first air mask may be a binary image. Merely by way of example, in the first air mask, element(s) that represent air may have a first value, while element(s) that do not represent air (e.g., the subject) may have a second value. The first value and the second value may be different. For example, the first value may be 1, while the second value may be 0. As another example, the first value may be 0, while the second value may be 1. The values are merely provided for the purposes of illustration, and not intended to limit the scope of the present disclosure.

In some embodiments, the air mask generation module 406 may determine the first air mask based on the raw data. Merely by way of example, the air mask generation module 406 may perform minimum value back projection (BP) for each element of an image (also referred to herein as image element) to determine a back projection value associated with the each element of the image. The each element of the image may refer to each element of the image to be reconstructed and may correspond to a spatial point of the subject. The air mask generation module 406 may generate a second seed image (also referred to as an air mask seed image) based on a plurality of back projection values associated with the plurality of elements corresponding to a plurality of spatial points of the subject. The air mask generation module 406 may further generate the first air mask by performing thresholding on the second seed image based on a second threshold. The second threshold may be a default value or an empirical value related to the imaging system 100. In some embodiments, the second threshold may be set according to a default setting of the imaging system 100 or preset by a user or operator via the terminals 130. It should be noted that in some embodiments, different from the FBP operation, the air mask generation module 406 may determine the first air mask without performing filtering on the raw data before the minimum value BP operation. In some embodiments, the filtering process in FBP (e.g., a ramp filter used in FBP) may suppress low-frequency components and enhance high-frequency components in the raw data. Besides, an FBP operation is sensitive to truncation. In some embodiments, there may be a sharp drop in data values at the place of truncation. That is, the filtering process may produce a sharp rise in data values near the edge of truncation, resulting in an artifact that appears as a white band in the resulting image. Moreover, the truncation artifact may propagate towards the center of the resulting image, degrading overall image quality. In minimum value BP operation, the value of each element may be determined based on a minimal raw datum among raw data detected from the plurality of angles. Therefore, the value may not be affected by artifacts, and further, the minimum value BP operation may be insensitive to truncation. More descriptions regarding the minimum value BP operation and the generation of the first air mask based on the raw data may be found elsewhere in the present disclosure (e.g., FIG. 6 and the relevant descriptions thereof).

Alternatively or additionally, the air mask generation module 406 may determine the first air mask based on the raw data and the (modified) first seed image. Merely by way of example, the air mask generation module 406 may determine the first air mask based on the raw data as illustrated above. The air mask generation module 406 may generate a second air mask based on the (modified) first seed image, for example, by performing thresholding on the (modified) first seed image based on a third threshold. The third threshold may be a default value or an empirical value related to the imaging system 100. In some embodiments, the third threshold may be set according to a default setting of the imaging system 100 or preset by a user or operator via the terminals 130. The third threshold may be the same as or different from the second threshold. Merely by way of example, for an element of the (modified) first seed image, the air mask generation module 406 may compare the value of the element (also referred to as an element value) with the third threshold. In response to a determination that the element value of the (modified) first seed image is less than the third threshold, the air mask generation module 406 may assign the first value to a corresponding element of the second air mask (i.e. an element of the second air mask corresponding to the element of the (modified) first seed image). In response to a determination that the element value of the (modified) first seed image exceeds the third threshold, the air mask generation module 406 may assign the second value to a corresponding element of the second air mask. It should be noted that, in response to a determination that the element value of the (modified) first seed image is equal to the third threshold, the air mask generation module 406 may assign either the first value or the second value to a corresponding element of the second air mask. For example, the corresponding element of the second air mask may be assigned with the first value. As another example, the corresponding element of the second air mask may be assigned with the second value. The second air mask may be generated when each of all elements of the second air mask is given a certain value (either the first value or the second value).

Then the air mask generation module 406 may modify the first air mask by performing a logic operation (also referred to as a Boolean operation) based on the first air mask and the second air mask. More descriptions regarding the generation of the first air mask based on the raw data and the (modified) first seed image may be found elsewhere in the present disclosure (e.g., FIG. 9 and the relevant descriptions thereof).

In 507, the processing device 140 (e.g., the reconstruction module 408) may reconstruct one or more images by performing an iterative reconstruction based on the first seed image, the first air mask, and/or the raw data. In some embodiments, the one or more images may include a 3D image or an image volume. Each of the one or more images may include a plurality of elements. Each element of the plurality of elements may be a pixel or voxel. The first seed image may provide an initial image estimate for the one or more images in the iterative reconstruction.

In some embodiments, the iterative reconstruction may include a plurality of forward projections and/or a plurality of back projections. The first air mask determined in 505 may be used in the plurality of forward projections and the plurality of back projections. For example, the first air mask may include element(s) representing air and element(s) not representing air (e.g., the subject). The element(s) representing air may have a first value (e.g., 0) and the element(s) not representing air may have a second value (e.g., 1). Element(s) representing air may be omitted in the iterative reconstruction in the forward projection(s) and/or the back projection(s). With the first air mask, the iterative reconstruction may be accelerated. Exemplary iterative reconstruction algorithms may include an adaptive statistical iterative reconstruction (ASiR), a model based iterative reconstruction (MBiR), an iterative reconstruction in image space (iRIS), a sinogram affirmed iterative reconstruction (SAFIRE), a double model based iterative reconstruction (DMBiR), an adaptive iterative dose reduction (AIDR), IMR, or the like, or any combination thereof.

In some embodiments, the first air mask may be updated in one or more iterations of the iterative reconstruction. Merely by way of example, the first air mask may be generated based on the first seed image. The first seed image may be updated in the iteration(s) of the iterative reconstruction, and thus, the first air mask may be updated based on the updated first seed image(s) in the iteration(s).

It should be noted that the above description of the process 500 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, a down-sampling may be performed on the raw data. The first air mask may be determined based on the down-sampled raw data. Alternatively or additionally, a down-sampling may be performed on the first (or second) seed image. The first air mask may be determined according to a plurality of pixel tiles of the down-sampled first (or second) seed image. Each of the plurality of pixel tiles may include N×M pixels, for example, 3×2 pixels, 4×4 pixels, 4×6 pixels, or the like. The number N may refer to the number (or count) of rows of a pixel tile, and the number M may refer to the number (or count) of columns of a pixel tile. In some embodiments, a morphological operation may be performed on the first air mask to modify the first air mask. The morphological operation may include an erosion operation, a dilation operation, or the like, or any combination thereof. In some embodiments, the first air mask may be used for image processing, image segmentation, image denoising, or the like.

In some embodiments, the air mask generation module 406 may determine the first air mask based on the (modified) first seed image. The air mask generation module 406 may determine the first air mask by performing thresholding on the (modified) first seed image based on a first threshold. The first threshold may be the same as or different from the second threshold or the third threshold. In certain embodiment, if the first threshold is the same as the third threshold, the first air mask generated based on the (modified) first seed image herein may be the same as the second air mask described above.

Figure 6:
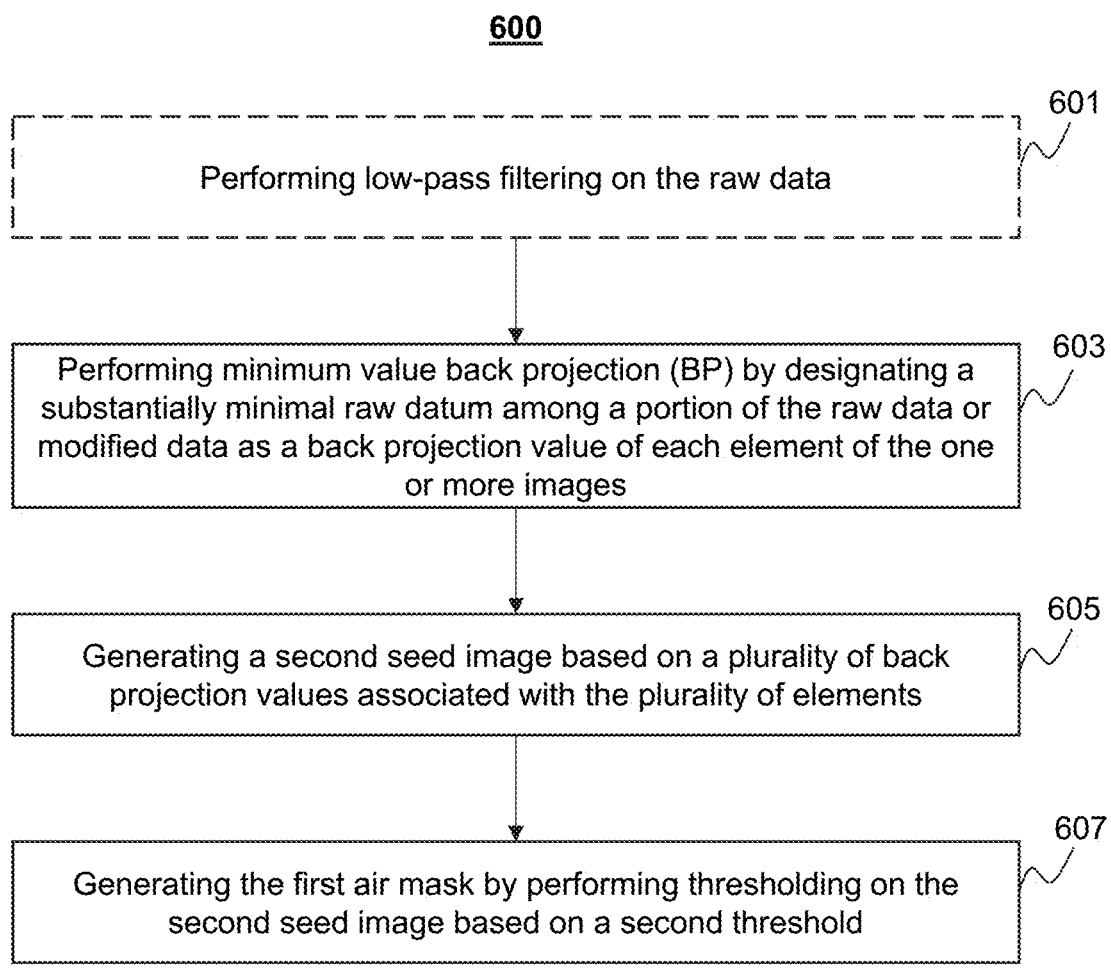
FIG. 6 is a flowchart illustrating an exemplary process for generating an air mask according to some embodiments of the present disclosure.

FIG. 6 is a flowchart illustrating an exemplary process for generating an air mask according to some embodiments of the present disclosure. In some embodiments, one or more operations of process 600 may be implemented in the imaging system 100 illustrated in FIG. 1. For example, the process 600 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 600 may be implemented on the imaging device 110. The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 505 of process 500 may be performed according to process 600.

In 601, the processing device 140 (e.g., the air mask generation module 406) may perform low-pass filtering on the raw data (e.g., the raw data obtained in 501). The raw data may be detected by a plurality of detectors of the detector module 112. The plurality of detectors may be arranged in a channel direction and a row direction. In some embodiments, the air mask generation module 406 may perform a one dimensional (1D) low-pass filtering on the raw data in the channel direction before performing minimum value BP. Alternatively, the air mask generation module 406 may perform a two-dimensional (2D) low-pass filtering on the raw data in the channel direction and the row direction before performing minimum value BP. In some embodiments, operation 601 may be omitted. The air mask generation module 406 may omit filtering on the raw data and directly perform minimum value BP on the raw data.

In 603, the processing device 140 (e.g., the air mask generation module 406) may perform minimum value BP by designating a substantially minimal raw datum among a portion of the raw data or modified data as a back projection value of each element of the one or more images to be reconstructed. The portion of the raw data may be associated with the each element and detected from a plurality of angles. The modified data may be generated by interpolation based on the raw data.

Merely by way of example, each element of an image may correspond to a spatial point of the subject. Radiation rays (e.g., X-rays) emitted from the radiation source 113 may pass through the spatial point of the subject at a plurality of angles and be detected by the detector module 112. The air mask generation module 406 may compare the detected raw data associated with the each element and designate a substantially minimal raw datum among the detected raw data as a back projection value of the each element. In some embodiments, a radiation ray that pass through a spatial point of the subject from a specific angle of the plurality of angles may not be directly detected by a detector of the detector module 112. For example, the radiation ray may irradiate on a gap between two detectors. The datum corresponding to the radiation ray (also referred to as a modified datum) may be generated by interpolation based on raw data detected at two or more angles adjacent to the specific angle. The interpolation may include nearest pixel interpolation, linear interpolation, or the like.

In 605, the processing device 140 (e.g., the air mask generation module 406) may generate a second seed image based on a plurality of back projection values associated with the plurality of elements. The second seed image (also referred to as an air mask seed image) may be generated by assigning each of the plurality of elements with a back projection value. Different from the first seed image generated based on FBP, the second seed image may be generated by performing minimum value BP on the raw data. In some embodiments, the second seed image may not reflect the actual attenuation information of radiation rays, and the second seed image may not be used as an initial image estimate for iterative reconstruction.

In 607, the processing device 140 (e.g., the air mask generation module 406) may generate the first air mask by performing thresholding on the second seed image based on a second threshold. In some embodiments, the first air mask may be used to distinguish element(s) representing air and/or element(s) not representing air (e.g., element(s) representing non-air). Merely by way of example, in the first air mask, element(s) that represent air may have a first value (e.g., 0), while element(s) that represent non-air may have a second value (e.g., 1).

In some embodiments, for an element of the second seed image, the air mask generation module 406 may compare the value of the element (also referred to as the element value) with the second threshold. Element(s) representing air may have low attenuation information of radiation rays than element(s) not representing air. In response to a determination that the element value of the second seed image is less than the second threshold, the air mask generation module 406 may assign the first value to a corresponding element of the first air mask (i.e., an element of the first air mask corresponding to the element of the second seed image). In response to a determination that the element value of the second seed image exceeds the second threshold, the air mask generation module 406 may assign the second value to a corresponding element of the first air mask. It should be noted that, in response to a determination that the element value of the second seed image is equal to the second threshold, the air mask generation module 406 may assign either the first value or the second value to a corresponding element of the first air mask. For example, the corresponding element of the first air mask may be assigned with the first value. As another example, the corresponding element of the first air mask may be assigned with the second value. The first air mask may be generated when each of all elements of the first air mask is given a certain value (either the first value or the second value). The second threshold may be a default value or an empirical value related to the imaging system 100.

It should be noted that the above description of the process 600 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, before performing the minimum value BP, the processing device 140 may perform a clip operation on the (filtered) raw data. A clip operation may refer to an operation in which one or more datum values are modified. In an exemplary clip operation, the processing device 140 may convert a portion of raw data whose datum values being less than a reference value into the reference value (e.g., convert negative into 0).

Figure 7A:
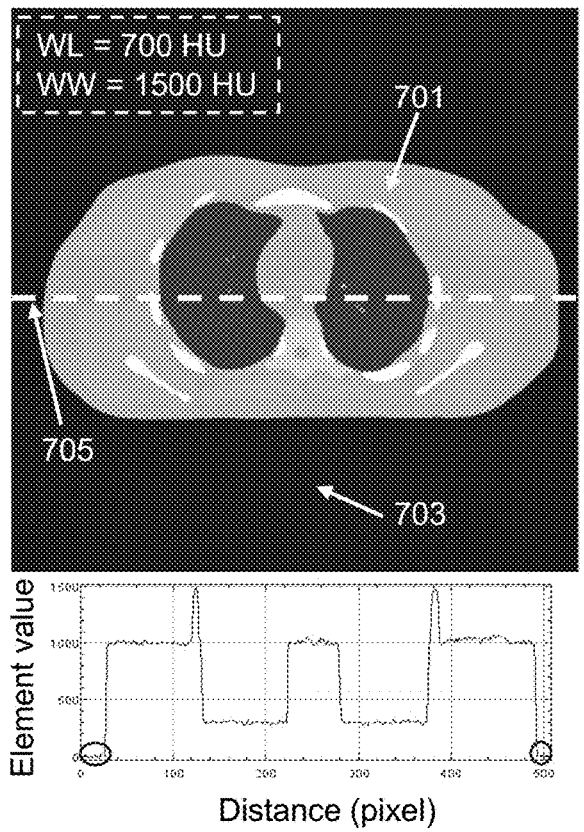
FIGS. 7A-7D are schematic diagrams illustrating exemplary seed images of a subject according to some embodiments of the present disclosure.
Figure 7B:
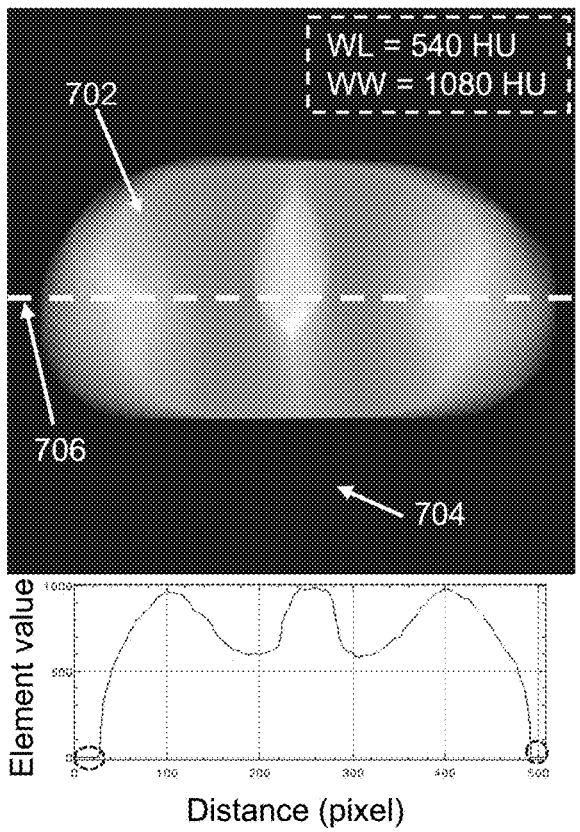
Figure 7C:
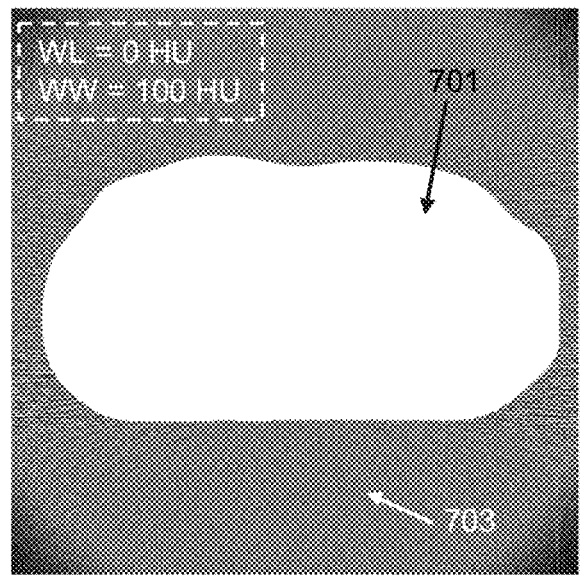
Figure 7D:
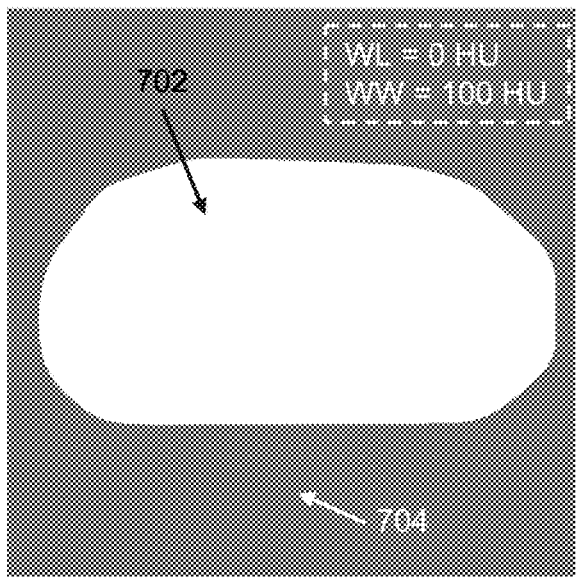

FIGS. 7A-7D are schematic diagrams illustrating exemplary seed images of a subject according to some embodiments of the present disclosure. The seed images shown in FIGS. 7A-7D are generated based on the same raw data without truncation. FIGS. 7A and 7C illustrate the same image shown under different window widths (WW) and window levels (WL), which is also referred to herein as a first seed image (also an FBP seed image). FIGS. 7B and 7D illustrate the same image shown under different window widths (WW) and window levels (WL), which is also referred to herein as a second seed image (also an air mask seed image). In some embodiments, window width (WW) of an image may affect the contrast ratio of the image, and window level (WL) of an image may affect the brightness of the image. The first seed image (also the FBP seed image) shown in FIGS. 7A and 7C is generated according to a Feldkamp-Davis-Kress (FDK) algorithm. The FDK algorithm is a type of an FBP algorithm. The second seed image (also the air mask seed image) shown in FIGS. 7B and 7D is generated according to the minimum value BP algorithm described in the present disclosure. A first region 701 shown in FIG. 7A illustrates the subject and a second region 703 (that is, the rest region) illustrates background information (e.g., air, a bed board, etc.). Similarly, a first region 702 shown in FIG. 7B illustrates the subject and a second region 704 (that is, the rest region) illustrates background information (e.g., air, a bed board, etc.).

A first profile of a plurality of elements of the FBP seed image at a row 705 is shown in FIG. 7A. A second profile of a plurality of elements of the air mask seed image at a row 706 is shown in FIG. 7B. The row 706 has a corresponding position with the row 705 (i.e., the row 705 and the row 706 may coincide if the FBP seed image and the air mask seed image are aligned and overlapped). The first profile reflects element values (e.g., gray values) of the row 705. The second profile reflects element values (e.g., gray values) of the row 706. The element values near 0 may correspond to air. The element values near 0 (marked with solid circles in FIG. 7A) in the first profile is fluctuant, which means that the variation of the element values near 0 in the row 705 is relatively obvious. The element values near 0 (marked with dashed circles in FIG. 7B) in the second profile is smooth, which means that the variation of the element values near 0 in the row 706 is relatively mild. If thresholding is performed on the FBP seed image and the air mask seed image to generate air masks respectively, the air mask generated based on the air mask seed image may be more accurate than the FBP seed image, because the thresholding operation is more likely to be affected by fluctuant element values.

To compare the first seed image and the second seed image, the first seed image and the second seed image are shown under the same WW and WL. Specifically, as shown in FIGS. 7C and 7D, the WW may be 100 Hounsfield unit (HU) and the WL may be 0 HU. As shown in FIG. 7C, the elements in the first region 701 have relatively high element values and are shown as white. The elements in the second region 703 have relatively low element values and are shown as gray. Similarly, as shown in FIG. 7D, the elements in the first region 702 have relatively high element values and are shown as white. The elements in the second region 704 have relatively low element values and are shown as gray. The element values of the second region 703 are inhomogeneous, while the element values of the second region 704 are homogeneous. That is, the second seed image can provide a clear outline of the subject and the noise in the second seed image may be minimized, which may facilitate the segmentation or differentiation of an air region and a non-air region (e.g., the subject) by thresholding. In some embodiments, an air mask may be generated by performing thresholding on the second seed image.

Figure 8A:
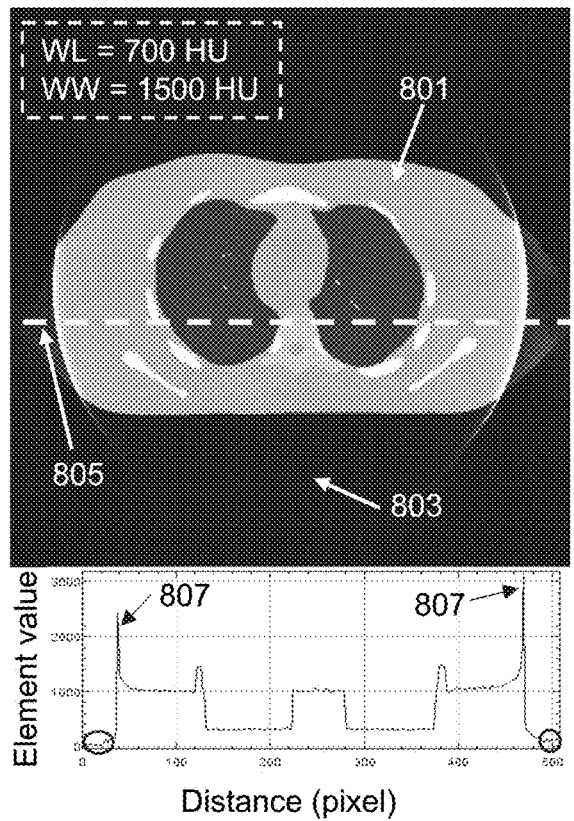
FIGS. 8A-8D are schematic diagrams illustrating exemplary seed images of a subject including truncation according to some embodiments of the present disclosure.
Figure 8B:
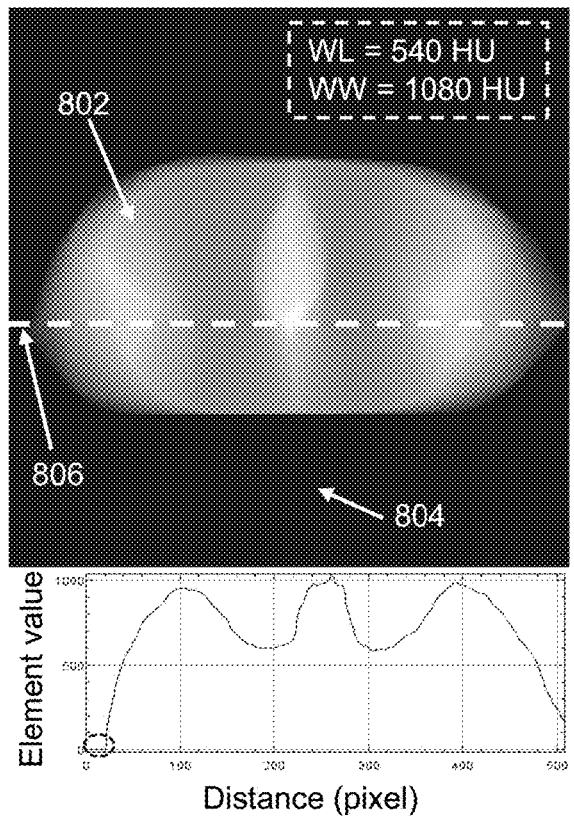
Figure 8C:
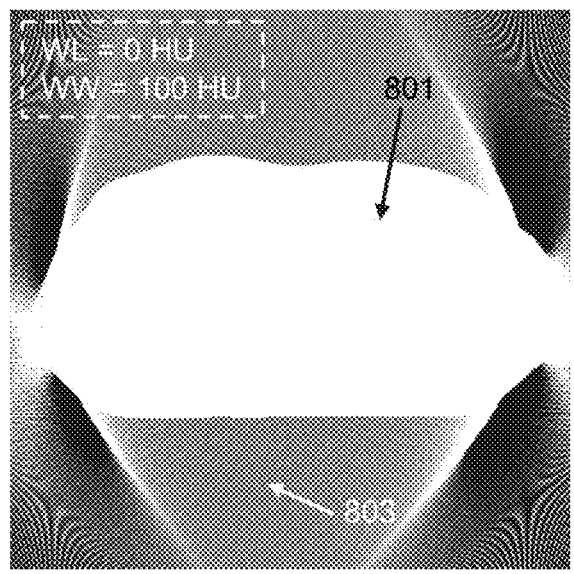
Figure 8D:
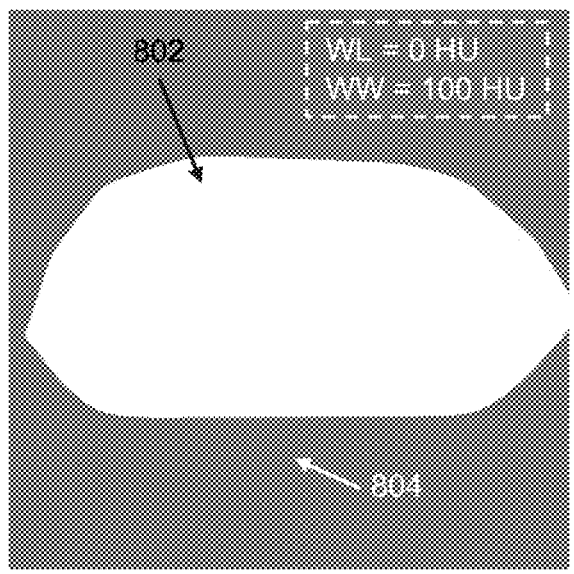

FIGS. 8A-8D are schematic diagrams illustrating exemplary seed images of a subject according to some embodiments of the present disclosure. The seed images shown in FIGS. 8A-8D are generated based on the same raw data with truncation. The truncation may be introduced in tomographic reconstruction if the subject extends outside a (scanned) field of view (FOV) of the imaging device 110. FIGS. 8A and 8C illustrate the same image shown under different window widths (WW) and window levels (WL), which is also referred to herein as the first seed image (also an FBP seed image). FIGS. 8B and 8D illustrate the same image shown under different window widths (WW) and window levels (WL), which is also referred to herein as the second seed image (also an air mask seed image). The first seed image (also the FBP seed image) shown in FIGS. 8A and 8C is generated according to a Feldkamp-Davis-Kress (FDK) algorithm. The FDK algorithm is a type of an FBP algorithm. The second seed image (also the air mask seed image) shown in FIGS. 8B and 8D is generated according to the minimum value BP algorithm described in the present disclosure. A first region 801 shown in FIG. 8A illustrates the subject and a second region 803 (that is, the rest region) illustrates background information (e.g., air, a bed board, etc.). Similarly, a first region 802 shown in FIG. 8B illustrates the subject and a second region 804 (that is, the rest region) illustrates background information (e.g., air, a bed board, etc.).

A first profile of a plurality of elements of the FBP seed image at a row 805 is shown in FIG. 8A. A second profile of a plurality of elements of the air mask seed image at a row 806 is shown in FIG. 8B. The row 806 has a corresponding position with the row 805 (i.e., the row 805 and the row 806 may coincide if the first seed image and the second seed image are aligned and overlapped). The first profile reflects element values (e.g., gray values) of the row 805. The second profile reflect element values (e.g., gray values) of the row 806. The element values near 0 may correspond to air. The element values near 0 (marked with solid circles in FIG. 8A) in the first profile fluctuate, which means that the variation of the element values near 0 in the row 805 is relatively obvious. The element values near 0 (marked with dashed circles in FIG. 8B) in the second profile is smooth, which means that the variation of the element values near 0 in the row 806 is relatively mild. Besides, due to data truncation, the values of the elements located at a boundary between air and the subject in the first profile may have a sudden change (as illustrated by the arrows 807 in FIG. 8A).

In some embodiments, to compare the first seed image and the second seed image, the first seed image and the second seed image are shown under the same WW and WL. Specifically, as shown in FIGS. 8C and 8D, the WW may be 100 HU and the WL may be 0 HU. As shown in FIG. 8C, the elements in the first region 801 may have relatively high element values and are shown as white. It should be noted that a portion of element values in the second region 803 are higher than the element values of air due to data truncation. Therefore, it is difficult to segment or differentiate air and the subject in the first seed image. As shown in FIG. 8D, the elements in the first region 802 have relatively high element values and are shown as white. The elements in the second region 804 have relatively low element values and are shown as gray. The element values of the second region 804 are homogeneous, so that it is convenient to segment or differentiate air and the subject in the second seed image. That is, when data truncation occurs or is performed, the second seed image generated by the minimum value BP algorithm described in the present disclosure may be more convenient to generate an air mask, and the generated air mask may be more accurate.

Figure 9:
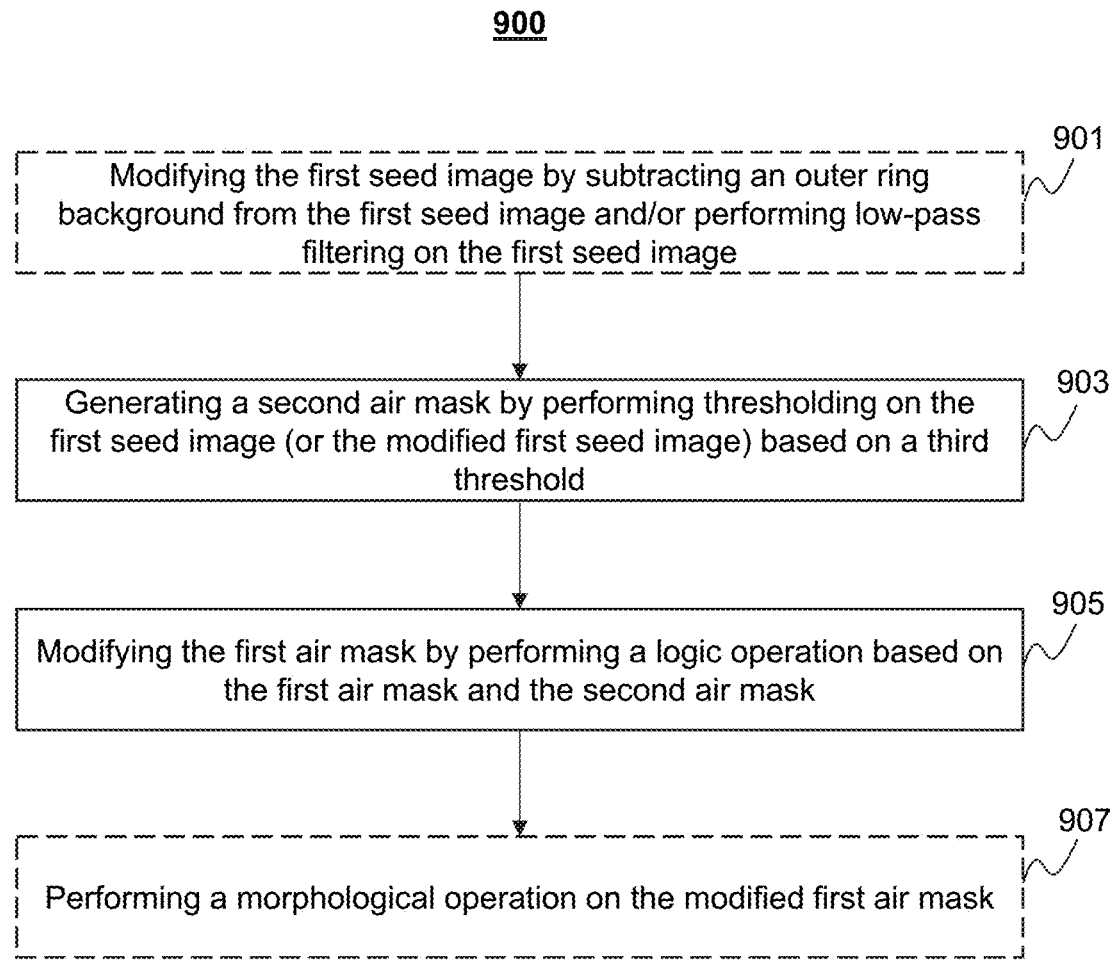
FIG. 9 is a flowchart illustrating another exemplary process for modifying an air mask according to some embodiments of the present disclosure.

FIG. 9 is a flowchart illustrating an exemplary process for modifying an air mask (e.g., the first air mask) according to some embodiments of the present disclosure. In some embodiments, one or more operations of process 900 may be implemented in the imaging system 100 illustrated in FIG. 1. For example, the process 900 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 900 may be implemented on the imaging device 110. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, operation 505 of process 500 may be performed according to process 900.

In 901, the processing device 140 (e.g., the seed image correction module 410) may modify the first seed image by subtracting an outer ring background from the first seed image and/or performing low-pass filtering on the first seed image.

In some embodiments, the seed image correction module 410 may perform low-pass filtering on the first seed image. For example, the seed image correction module 410 may perform a 1D low-pass filtering on the first seed image in the channel direction of a plurality of detectors of the detector module 112. As another example, the seed image correction module 410 may perform a 2D low-pass filtering on the first seed image in the channel direction and the row direction of the plurality of detectors of the detector module 112. The size of a 2D filter may be, for example, 5×5, 10×10, or the like. In some embodiments, the seed image correction module 410 may modify the first seed image by subtracting an outer ring background from the first seed image. The outer ring may correspond to a region between a (scanned) field of view (FOV) of the imaging device 110 and the gantry bore of the imaging device 110. More descriptions regarding the modification and/or correction of the first seed image may be found elsewhere in the present disclosure (e.g., operation 1405 of process 1400, process 1600, and the relevant descriptions thereof).

In 903, the processing device 140 (e.g., the air mask generation module 406) may generate a second air mask by performing thresholding on the (modified) first seed image based on a third threshold. The second air mask may be a binary image and may include elements with a first value and elements with a second value. In some embodiments, the element(s) with the first value may represent air, and the element(s) with the second value may represent other areas of an image (e.g., the subject). In some embodiments, the second air mask may be different from the first air mask (i.e., at least one element of the second air mask may be different from a corresponding element of the first air mask). In some embodiments, the second air mask may be used to modify the first air mask. In some embodiments, operation 901 may be omitted, and the second air mask may be generated by performing thresholding on the first seed image based on the third threshold.

In some embodiments, for an element of the (modified) first seed image, the air mask generation module 406 may compare the value of the element with the third threshold. In response to a determination that the value of the element of the (modified) first seed image is less than the third threshold, the air mask generation module 406 may assign the first value to a corresponding element of the second air mask (i.e. an element of the second air mask corresponding to the element of the (modified) first seed image). In response to a determination that the value of the element of the (modified) first seed image exceeds the third threshold, the air mask generation module 406 may assign the second value to a corresponding element of the second air mask. It should be noted that, in response to a determination that the value of the element of the (modified) first seed image is equal to the third threshold, the air mask generation module 406 may assign either the first value or the second value to a corresponding element of the second air mask. For example, the corresponding element of the second air mask may be assigned with the first value. As another example, the corresponding element of the second air mask may be assigned with the second value. The second air mask may be generated when each of the elements of the second air mask is given a certain value (either the first value or the second value). The third threshold may be a default value or an empirical value related to the imaging system 100. In some embodiments, the third threshold may be set according to a default setting of the imaging system 100 or preset by a user or operator via the terminals 130.

In 905, the processing device 140 (e.g., the air mask generation module 406) may modify the first air mask by performing a logic operation (also referred to as a Boolean operation) based on the first air mask (e.g., the first air mask generated in 607) and the second air mask. In some embodiments, the air mask generation module 406 may perform an "OR" operation or an "AND" operation on the first air mask and the second air mask. In some embodiments, both the first air mask and the second air mask may be binary images. Merely by way of example, in the first air mask and the second air mask, elements that represent air may have the first value, while elements that represent other areas (e.g., the subject) may have the second value. The first value and the second value may be different. For example, the first value may be 1, while the second value may be 0. As another example, the first value may be 0, while the second value may be 1. The values are merely provided for the purposes of illustration, and are not intended to limit the scope of the present disclosure.

Merely by way of example, when modifying the first air mask, the air mask generation module 406 may select to perform an AND operation. That is, the air mask generation module 406 may perform the AND operation on the elements in the first air mask and the corresponding elements in the second air mask. As another example, when modifying the first air mask, the air mask generation module 406 may select to perform an OR operation. That is, the air mask generation module 406 may perform the OR operation on the elements in the first air mask and the corresponding elements in the second air mask. The selection ways may be determined by default settings of the imaging system 100, or preset or adjusted by a user via the terminals 130.

Merely by way of example, the values of the elements representing air in the first air mask and the second air mask may be 0 and the values of the elements representing other areas in the first air mask and the second air mask may be 1. If an OR operation is performed, the number (or count) of the elements not representing air in the modified first air mask may increase relative to the first air mask, and accordingly, the number (or count) of the elements representing air in the modified first air mask may decrease relative to the first air mask. Thus, iterative reconstruction based on the modified first air mask may be affecting more pixels than that based on the original first air mask, adding computational cost to the reconstruction. Alternatively, if an AND operation is performed, the number (or count) of the elements not representing air in the modified first air mask may decrease relative to the first air mask, and accordingly, the number (or count) of the elements representing air in the modified first air mask may increase relative to the first air mask. Thus, the iterative reconstruction based on the modified first air mask may be accelerated.

As another example, the values of the elements representing air in the first air mask and the second air mask may be 1 and the values of the elements not representing air in the first air mask and the second air mask may be 0. If an OR operation is performed, the number (or count) of the elements representing air in the modified first air mask may increase relative to the first air mask, and accordingly, the number (or count) of the elements not representing air in the modified first air mask may decrease relative to the first air mask. Thus, iterative reconstruction based on the modified first air mask may be accelerated. Alternatively, if an AND operation is performed, the number (or count) of the elements representing air in the modified first air mask may decrease relative to the first air mask, and accordingly, the number (or count) of the elements not representing air in the modified first air mask may increase relative to the first air mask. Thus, iterative reconstruction based on the modified first air mask may be affecting more pixels than that based on the original first air mask, adding computational cost to the reconstruction.

In 907, the processing device 140 (e.g., the air mask generation module 406) may perform a morphological operation on the modified first air mask. In some embodiments, the morphological operation may include an erosion operation, a dilation operation, an opening operation, a closing operation, or the like, or any combination thereof. In some embodiments, the air mask generation module 406 may perform the morphological operation based on a structure element. The structure element may be a relatively small binary image (i.e., a relatively small matrix of pixels or voxels, each with a value of 1 or 0). In some embodiments, the size of the structure element may be smaller than the air mask. In some embodiments, the size of the structure element may be 3×4, 5×5, 10×10, or the like. In some embodiments, an origin of the structure element may be one of the pixels or voxels. In some embodiments the value of the origin of the structure element may be 1. In some embodiments, the modified first air mask may be still a binary image, including elements with a first value (e.g., 0) and a second value (e.g., 1). The air mask generation module 406 may perform the morphological operation on the modified first air mask.

It should be noted that the above description of the process 900 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, operation 907 may be omitted. In some embodiments, the modified first air mask generated in 905 or the further modified first air mask generated in 907, instead of the first air mask generated in 505, may be used in the iterative reconstruction as exemplified in 507 to accelerate the image reconstruction.

Figure 10A:
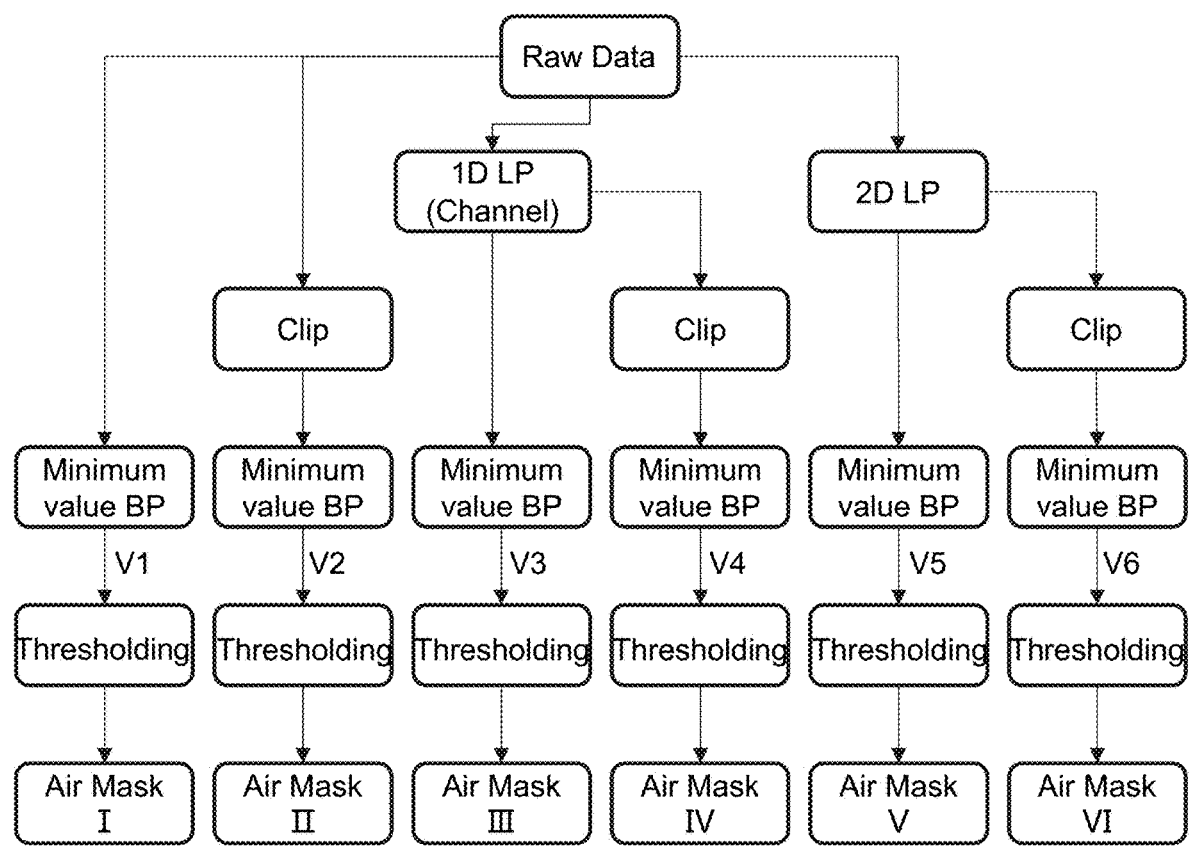
FIG. 10A is a schematic diagram illustrating exemplary processes for air mask generation according to some embodiments of the present disclosure.

FIG. 10A is a schematic diagram illustrating exemplary processes for air mask generation according to some embodiments of the present disclosure. One or more air masks may be generated by performing different operations on the raw data.

Merely by way of example, as shown in FIG. 10A, the processing device 140 may perform minimum value BP on the raw data to generate an air mask seed image V1, further perform thresholding on the air mask seed image V1 based on a threshold T1, and then an air mask I may be determined. More descriptions of the generation of the air mask I may be found elsewhere in the present disclosure (e.g., operations 603 through 607 illustrated in FIG. 6 and descriptions thereof). The threshold T1 may be, e.g., a default value or an empirical value related to the imaging system 100.

As another example, the processing device 140 may first perform a clip operation on the raw data, perform minimum value BP on the clipped raw data to generate an air mask seed image V2, further perform thresholding on the air mask seed image V2 based on a threshold T2, and then an air mask II may be determined. More descriptions of the generation of the air mask II may be found elsewhere in the present disclosure (e.g., process 600 illustrated in FIG. 6 and descriptions thereof). The threshold T2 may be, e.g., a default value or an empirical value related to the imaging system 100.

As a further example, the processing device 140 may perform a 1D low-pass filtering on the raw data in the channel direction, perform minimum value BP on the filtered raw data to generate an air mask seed image V3, further perform thresholding on the air mask seed image V3 based on a threshold T3, and then an air mask III may be determined. More descriptions of the generation of the air mask III may be found elsewhere in the present disclosure (e.g., process 600 illustrated in FIG. 6 and descriptions thereof). The threshold T3 may be, e.g., a default value or an empirical value related to the imaging system 100.

As still a further example, the processing device 140 may perform a 1D low-pass filtering on the raw data in the channel direction, perform a clip operation on the filtered raw data, perform minimum value BP on the clipped raw data to generate an air mask seed image V4, further perform thresholding on the air mask seed image V4 based on a threshold T4, and then an air mask IV may be determined. More descriptions of the generation of the air mask IV may be found elsewhere in the present disclosure (e.g., process 600 illustrated in FIG. 6 and descriptions thereof). The threshold T4 may be, e.g., a default value or an empirical value related to the imaging system 100.

As still a further example, the processing device 140 may perform a 2D low-pass filtering on the raw data in the channel direction and the row direction, perform minimum value BP on the filtered raw data to generate an air mask seed image V5, further perform thresholding on the air mask seed image V5 based on a threshold T5, and then an air mask V may be determined. More descriptions of the generation of the air mask V may be found elsewhere in the present disclosure (e.g., process 600 illustrated in FIG. 6 and descriptions thereof). The threshold T5 may be, e.g., a default value or an empirical value related to the imaging system 100.

As still a further example, the processing device 140 may perform a 2D low-pass filtering on the raw data in the channel direction and the row direction, perform a clip operation on the filtered raw data, perform minimum value BP on the clipped raw data to generate an air mask seed image V6, further perform thresholding on the air mask seed image V6 based on a threshold T6, and then an air mask VI may be determined. More descriptions of the generation of the air mask VI may be found elsewhere in the present disclosure (e.g., process 600 illustrated in FIG. 6 and descriptions thereof). The threshold T6 may be, e.g., a default value or an empirical value related to the imaging system 100. In some embodiments, all of the thresholds T1-T6 may be the same. In some embodiments, at least two thresholds of the thresholds T1-T6 may be the same. In some embodiments, at least two thresholds of the thresholds T1-T6 may be different. In some embodiments, all of the thresholds T1-T6 may be different from each other.

Figure 10B:
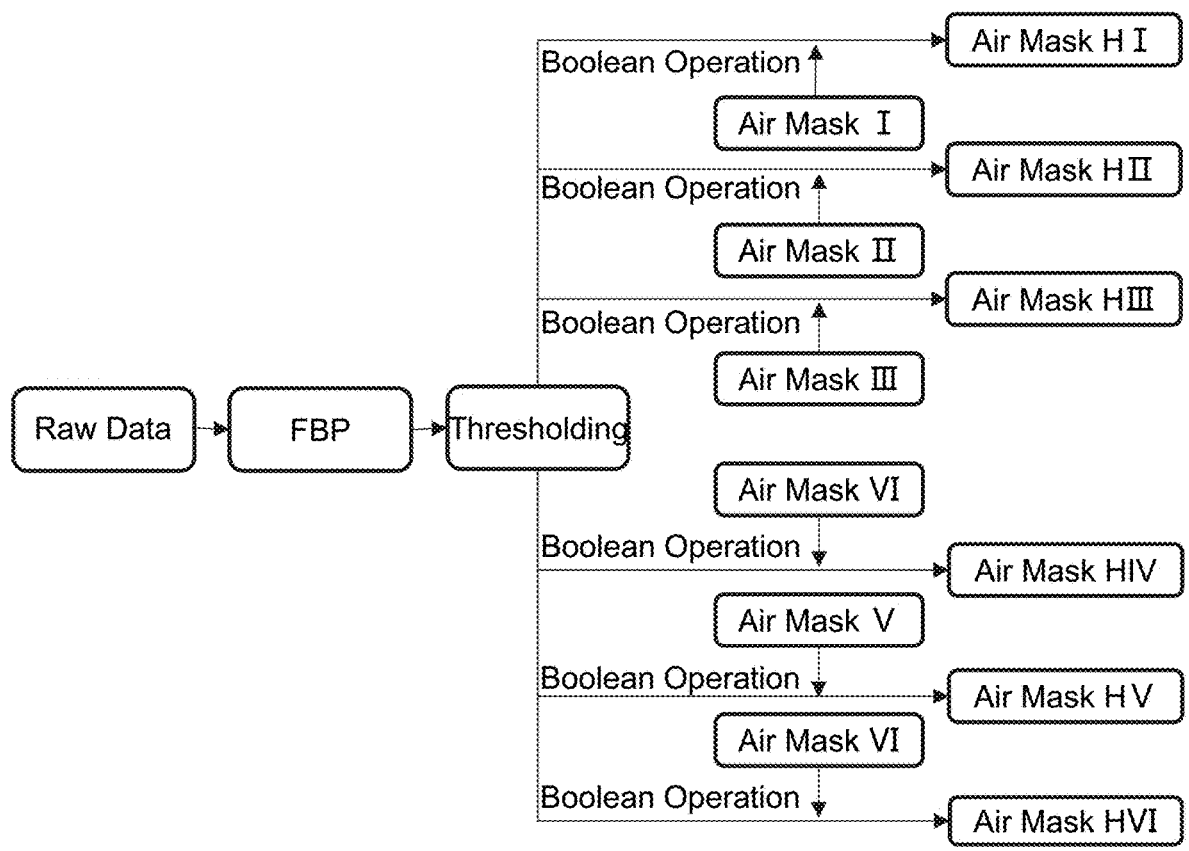
FIG. 10B is a schematic diagram illustrating exemplary processes for air mask generation according to some embodiments of the present disclosure.

FIG. 10B is a schematic diagram illustrating exemplary processes for air mask generation according to some embodiments of the present disclosure. As shown in FIG. 10B, the processing device 140 may perform FBP on the raw data to generate an FBP seed image, and perform thresholding on the FBP seed image based on a threshold T to generate a second air mask. The raw data used in FIG. 10B are the same as those in FIG. 10A. The threshold T may be, e.g., a default value or an empirical value related to the imaging system 100. The processing device 140 may determine an air mask HI by performing a Boolean operation on the air mask I (see FIG. 10A) and the second air mask, determine an air mask HII by performing a Boolean operation on the air mask II (see FIG. 10A) and the second air mask, determine an air mask HIII by performing a Boolean operation on the air mask III (see FIG. 10A) and the second air mask, determine an air mask HIV by performing a Boolean operation on the air mask IV (see FIG. 10A) and the second air mask, determine an air mask HV by performing a Boolean operation on the air mask V (see FIG. 10A) and the second air mask, and determine an air mask HVI by performing a Boolean operation on the air mask VI (see FIG. 10A) and the second air mask. More descriptions of the generation of the air masks HI-HVI may be found elsewhere in the present disclosure (e.g., operations 903 and 905 illustrated in FIG. 9 and the descriptions thereof).

Figure 11A:
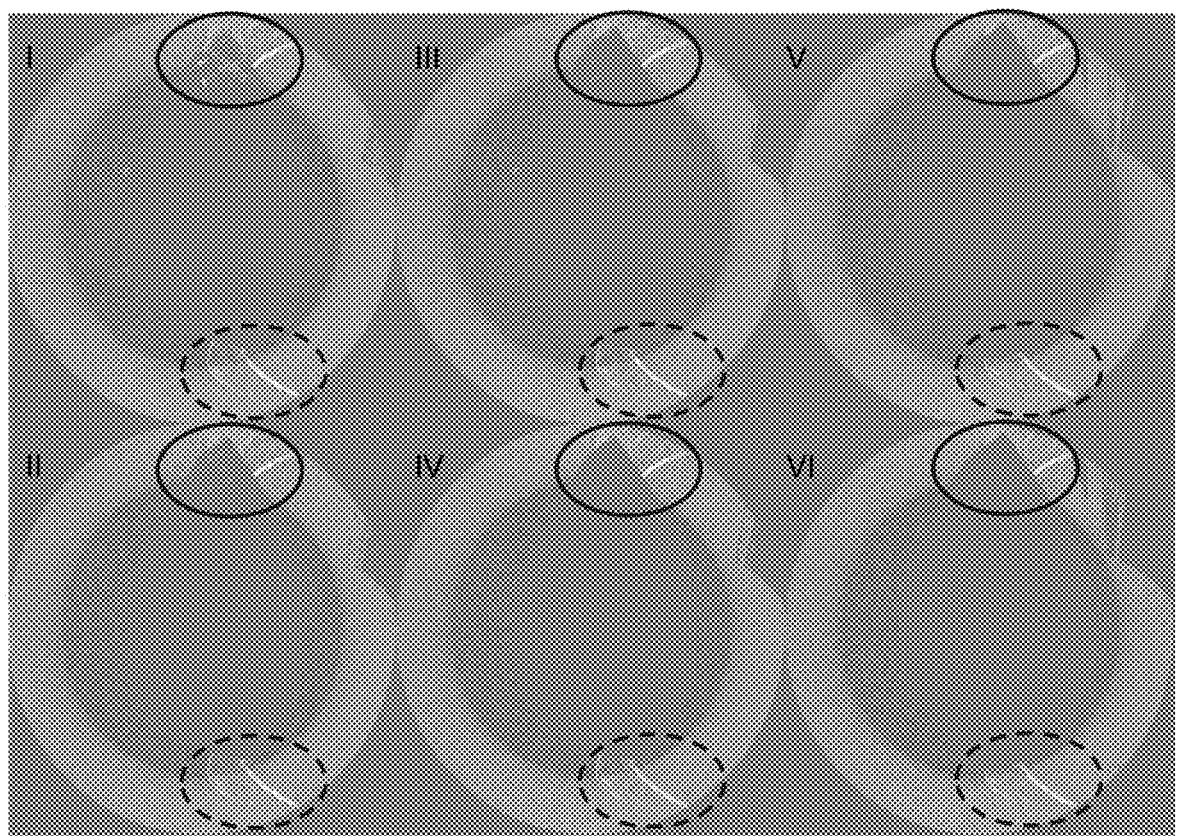
FIG. 11A shows exemplary images generated according to an iterative reconstruction algorithm based on the one or more air masks described in FIG. 10A.

FIG. 11A shows air mask seed images corresponding to the air masks described in FIG. 10A. The air mask seed images may be generated according to the processes illustrated in FIG. 10A, i.e., air mask seed images V1-V6. By performing thresholding on the air mask seed images, the corresponding air masks may be generated. As illustrated in FIG. 11A, the air mask seed image corresponding to the air mask I is referred to as air mask seed image I, the air mask seed image corresponding to the air mask II is referred to as air mask seed image II, the air mask seed image corresponding to the air mask III is referred to as air mask seed image III, the air mask seed image corresponding to the air mask IV is referred to as air mask seed image IV, the air mask seed image corresponding to air mask V is referred to as air mask seed image V, the air mask seed image corresponding to air mask VI is referred to as air mask seed image VI. The air mask seed images I-VI were generated with data truncations. The data truncations may be introduced if the subject extends outside a (scanned) field of view (FOV) of the imaging device 110. Stripes were introduced to the air mask seed images due to the data truncations (e.g., the stripes in the circles in solid lines and dotted lines in the air mask seed images I-VI in FIG. 11A). The air mask seed image VI includes less stripes (e.g., stripes in the solid line), which may facilitate the segmentation or differentiation of an air region and a non-air region by thresholding.

Figure 11B:
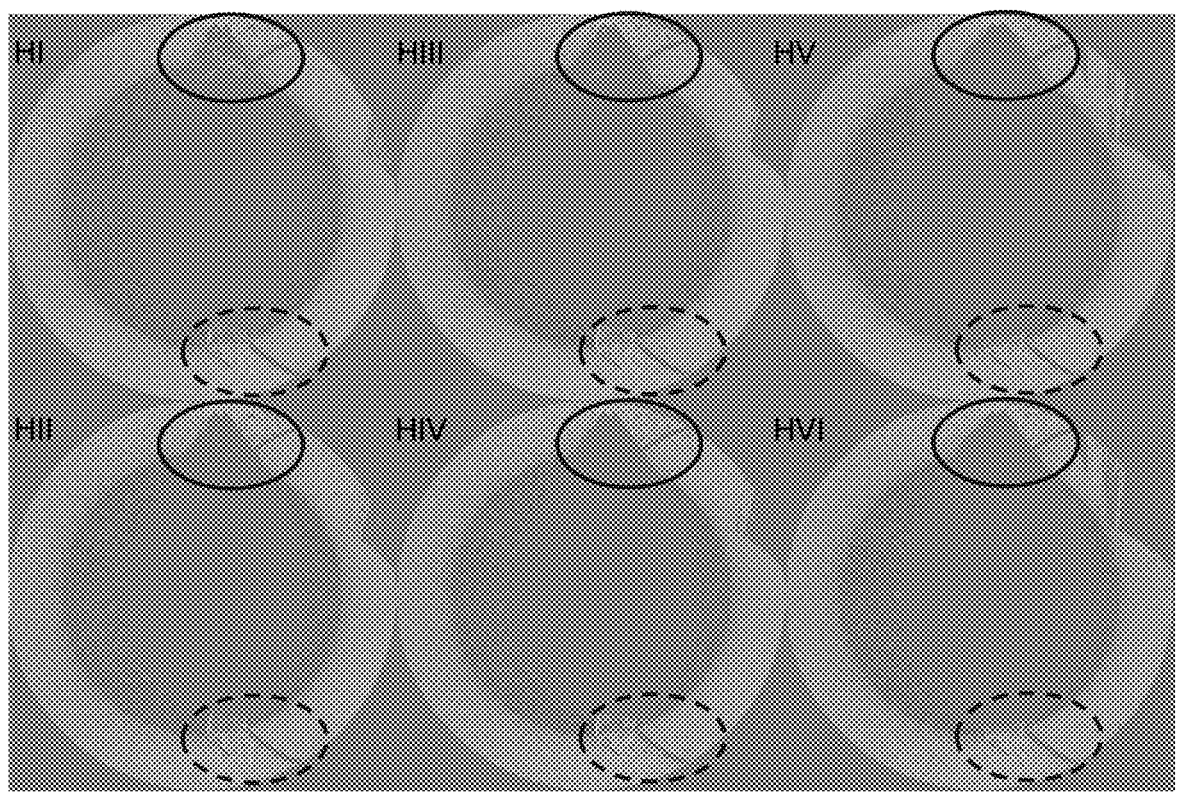
FIG. 11B shows exemplary images generated according to an iterative reconstruction algorithm based on the one or more air masks described in FIG. 10B.

FIG. 11B shows air mask seed images corresponding to the air masks described in FIG. 10B. The air mask seed images may be generated by modifying the air mask seed images I-VI using a FBP seed image. By performing thresholding on the air mask seed images, the corresponding air masks may be generated. As illustrated in FIG. 11B, the air mask seed image corresponding to the air mask HI is referred to as air mask seed image HI, the air mask seed image corresponding to the air mask HII is referred to as air mask seed image HII, the air mask seed image corresponding to the air mask Hill is referred to as air mask seed image HIII, the air mask seed image corresponding to the air mask HIV is referred to as air mask seed image HIV, the air mask seed image corresponding to air mask HV is referred to as air mask seed image HV, the air mask seed image corresponding to air mask HVI is referred to as air mask seed image HVI. As shown in FIG. 11B, the stripes in the circles in solid lines in the air mask seed images HI-HVI were reduced with respect to those in the air mask seed images I-VI in FIG. 11A. The stripes in circles in dotted lines in the air mask seed images HI-HVI were reduced than those in the air mask seed images I-VI. The air mask seed image HVI has the least stripes, and provide a clear outline of a subject. Thus, the air mask seed image HVI can effectively identify an air region that is polluted by the streaks, and identify a subject that has similar HU as the air region.

Figure 12A:
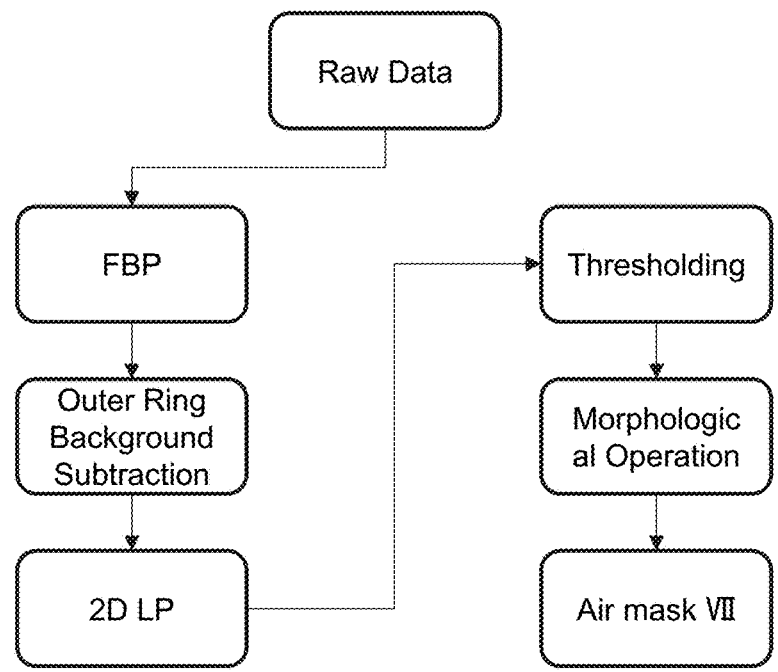
FIG. 12A is schematic diagram illustrating an exemplary process for air mask generation according to some embodiments of the present disclosure.

FIG. 12A is schematic diagram illustrating an exemplary process for air mask generation according to some embodiments of the present disclosure. As shown in FIG. 12A, the processing device 140 may perform FBP on the raw data to generate the first seed image. The processing device 140 may modify the first seed image by subtracting an outer ring background from the first seed image to optimize the first seed image. The processing device 140 may perform a 2D low-pass filtering on the first seed image to reduce streak artifacts. The streak artifacts may be generated in the back projection process due to interpolation between projection lines. The presence of streak artifacts may result in misinterpretation of tomographic features. Thus, it may be desirable to reduce streak artifacts in some embodiments. Merely for illustration purposes, the size of the 2D filter may be 5×5 herein. The processing device 140 may further perform thresholding on the modified (i.e., optimized and/or filtered) first seed image based on a threshold T to generate an air mask VII. The first threshold T may be, e.g., a default value or an empirical value related to the imaging system 100. For example, the threshold T may be 30 HU when the raw data include CT data. The processing device 140 may further perform a morphological operation on the air mask VII, and a modified air mask VII may be determined. For example, the processing device 140 may perform a 2D dilation operation on the air mask VII. The size of the structure element used in the 2D dilation operation may be, e.g., 10×10, which is greatly smaller than the size of the air mask VII.

Figure 12B:
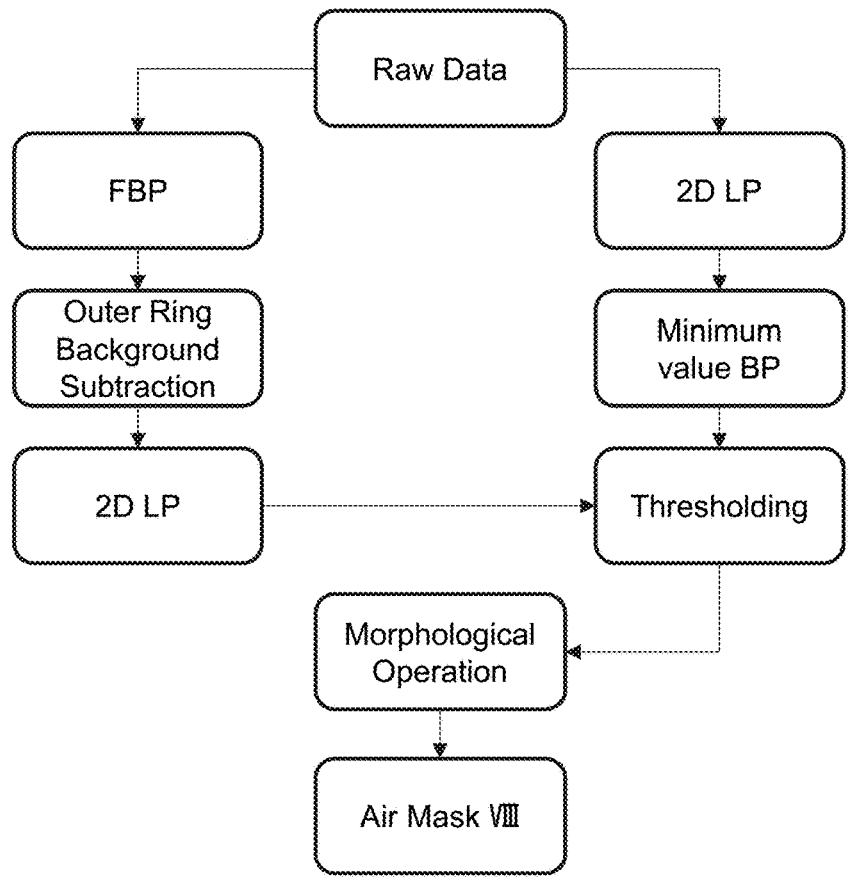
FIG. 12B is schematic diagram illustrating another exemplary process for air mask generation according to some embodiments of the present disclosure.

FIG. 12B is schematic diagram illustrating another exemplary process for air mask generation according to some embodiments of the present disclosure. As shown in FIG. 12B, the processing device 140 may perform FBP on the raw data to generate a first seed image. The raw data used in FIG. 12B are the same as those in FIG. 12A. The processing device 140 may modify the first seed image by subtracting an outer ring background from the first seed image to optimize the first seed image. The processing device 140 may perform a 2D low-pass filtering on the first seed image to reduce streak artifacts. The streak artifacts may be generated in the back projection process due to interpolation between projection lines. The presence of streak artifacts may result in misinterpretation of tomographic features. Thus, it may be desirable to reduce streak artifacts in some embodiments. Merely for illustration purposes, the size of the 2D filter may be 5×5 herein. The processing device 140 may perform thresholding on the modified (i.e., optimized and/or filtered) first seed image based on a first threshold T1 to generate a second air mask. The first threshold T1 may be, e.g., a default value or an empirical value related to the imaging system 100. For example, the first threshold T1 may be 30 HU when the raw data include CT data. At the same time, the processing device 140 may perform a 2D low-pass filtering on the raw data, and perform minimum value BP on the filtered raw data to generate a second seed image. The processing device 140 may further perform thresholding on the second seed image based on a second threshold T2 to generate a first air mask. The second threshold T2 may be, e.g., a default value or an empirical value related to the imaging system 100. For example, the second threshold T2 may be 0. The processing device 140 may perform a Boolean operation on the first air mask and the second air mask. For example, the processing device 140 may determine a modified first air mask (e.g., air mask VIII) by performing an OR operation on the first air mask and the second air mask. After the OR operation, the number (or count) of the elements not representing air in the air mask VIII may increase relative to the air mask VII. In some embodiments, the processing device 140 may also perform a morphological operation on the air mask VIII, and a modified air mask VIII may be determined. For example, the processing device 140 may perform a closing operation (first dilation operation and then erosion operation) on the air mask VIII. The size of the structure element used in the closing operation may be 10×10, which is greatly smaller than the size of the air mask VIII.

Figure 13A:
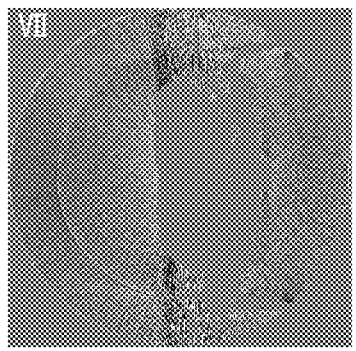
FIGS. 13A and 13B show exemplary air mask seed images of a portion of a subject without truncation according to some embodiments of the present disclosure.
Figure 13B:
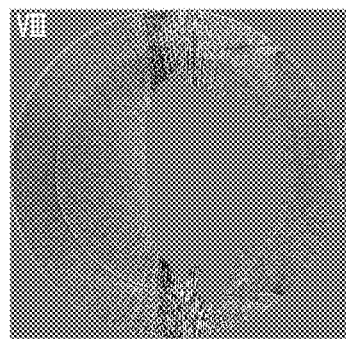
Figure 13C:
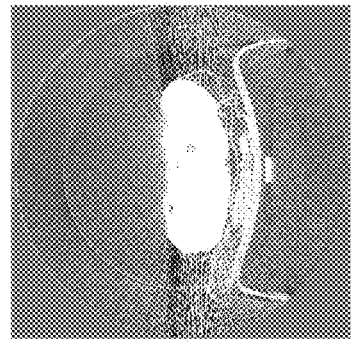
FIG. 13C shows an exemplary FBP seed image generated based on the same raw data of the same subject as those in FIGS. 13A and 13B.

FIGS. 13A and 13B show exemplary air mask seed images of a portion of a subject without truncation according to some embodiments of the present disclosure. The air mask seed image shown in FIG. 13A is generated according to the process illustrated in FIG. 12A. By performing thresholding on the air mask seed image VII, the corresponding air mask VII may be generated. The air mask seed image shown in FIG. 13B is generated according to the process illustrated in FIG. 12B. By performing thresholding on the air mask seed image VIII, the corresponding air mask VIII may be generated. FIG. 13C shows an exemplary FBP seed image generated based on the same raw data of the same subject as those in FIGS. 13A and 13B. The FBP seed image shown in FIG. 13C was generated according to an FBP algorithm.

Figure 13D:
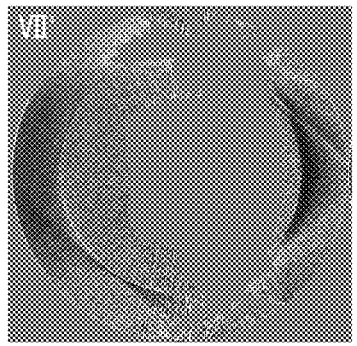
FIGS. 13D and 13E show exemplary air mask seed images of another portion of the subject with truncation according to some embodiments of the present disclosure.
Figure 13E:
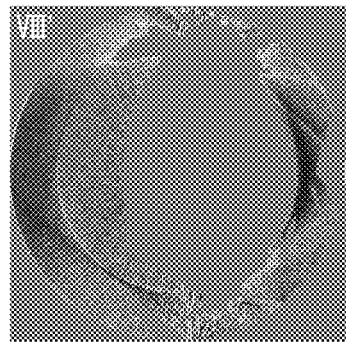
Figure 13F:
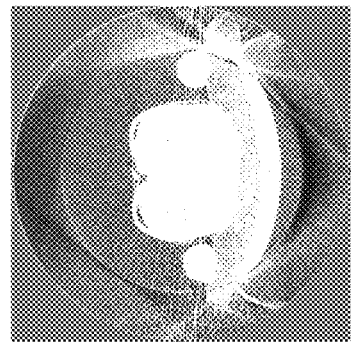
FIG. 13F shows an exemplary FBP seed image generated based on the same raw data of the same subject as those in FIGS. 13D and 13E.

FIGS. 13D and 13E show exemplary air mask seed images of another portion of the subject with truncation according to some embodiments of the present disclosure. Similar to the air mask seed image VII in FIG. 13A, the air mask seed image VII' shown in FIG. 13D is generated according to the process illustrated in FIG. 12A. Similar to the air mask seed image VIII, the air mask seed image VIII' shown in FIG. 13E is generated according to the process illustrated in FIG. 12B. FIG. 13F shows an exemplary FBP seed image generated based on the same raw data of the same subject as those in FIGS. 13D and 13E. The FBP seed image shown in FIG. 13F was generated according to an FBP algorithm.

As shown in FIGS. 13A and 13B, the background information (e.g., the bed board, air) and the subject may be effectively identified in the air mask seed images VII and VIII. Air mask seed image VII contains holes (e.g., each hole may correspond to an air region) between regions of interest of the subject, while air mask seed image VIII contains a fewer number (or count) of air regions and may be more connected. As shown in FIGS. 13D and 13E, the background information (e.g., the bed board, air) and the subject may be effectively identified in the air mask seed image VII' and the air mask seed image VIII'. Air mask seed image VII' contains holes (e.g., each hole may correspond to an air region) between regions of interest of the subject, while air mask seed image VIII' contains a fewer number (or count) of air regions and may be more connected. Thus, iterative reconstruction based on air mask VIII (e.g., air mask generated based on the air mask seed image VIII' or the air mask seed image VIII) may be more computationally expensive and safer than that based on air mask VII (e.g., air mask generated based on the air mask seed image VII' or the air mask seed image VII).

Figure 14A:
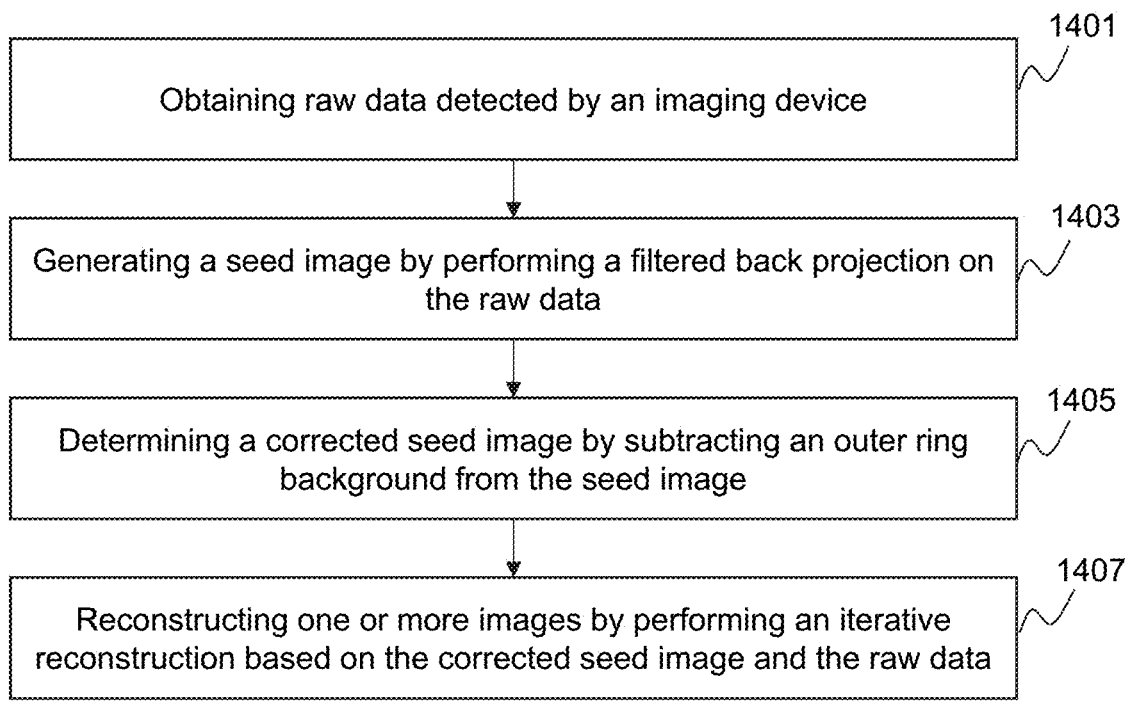
FIG. 14A is a flowchart illustrating an exemplary process for reconstructing one or more images according to some embodiments of the present disclosure.

FIG. 14A is a flowchart illustrating an exemplary process for reconstructing one or more images according to some embodiments of the present disclosure. In some embodiments, one or more operations of process 1400 may be implemented in the imaging system 100 illustrated in FIG. 1. For example, the process 1400 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 1400 may be implemented on the imaging device 110. The operations of the illustrated process presented below are intended to be illustrative. In some embodiments, the process 1400 may be accomplished with one or more additional operations not described, and/or without one or more of the operations discussed. Additionally, the order in which the operations of the process 1400 as illustrated in FIG. 14A and described below is not intended to be limiting.

In 1401, the processing device 140 (e.g., the acquisition module 402) may obtain raw data detected by an imaging device (e.g., the imaging device 110). The raw data may reflect attenuation information of radiation rays (e.g., X-rays) that pass through a subject, and may be generally used to generate one or more images related to the subject. In some embodiments, the raw data may be detected and/or collected from a plurality of angles by the imaging device 110. The raw data may include a plurality of sets of data corresponding to the plurality of angles. In some embodiments, a set of raw data collected from the same angle may also be referred to as a view. More descriptions regarding the raw data may be found elsewhere in the present disclosure (e.g., operation 501 of the process 500 and the relevant descriptions thereof).

In some embodiments, the acquisition module 402 may obtain the raw data from one or more components of the imaging system 100, such as the imaging device 110, a terminal (e.g., the terminal 130), a storage device (e.g., the storage device 150), or the like. Alternatively or additionally, the acquisition module 402 may obtain the raw data from an external source via the network 120. For example, the acquisition module 402 may obtain the raw data from, for example, a medical database, etc.

In 1403, the processing device 140 (e.g., the seed image generation module 404) may generate a seed image. In some embodiments, the seed image generation module 404 may generate the seed image by performing an FBP on the raw data obtained in 1401. The seed image may include a plurality of elements. Each of the elements may be a pixel or voxel that corresponds to a spatial point of the subject. In an exemplary FBP operation, the seed image generation module 404 may perform filtering on one or more sets (e.g., each set) of the raw data. In some embodiments, the filtering may be performed using, for example, a high-pass filter, a slope filter, or the like, or any combination thereof. In some embodiments, each set of raw data (also referred to as each view) may be convolved with a filter kernel to generate a filtered view. The seed image generation module 404 may perform back projection on the plurality of filtered views to reconstruct the first seed image.

In 1405, the processing device 140 (e.g., the seed image correction module 410) may determine a corrected seed image by subtracting an outer ring background from the seed image. The outer ring background may correspond to a background of an outer ring. The outer ring may correspond to a region between a (scanned) field of view (FOV) of the imaging device 110 and a gantry bore of the imaging device 110.

Figure 14B:
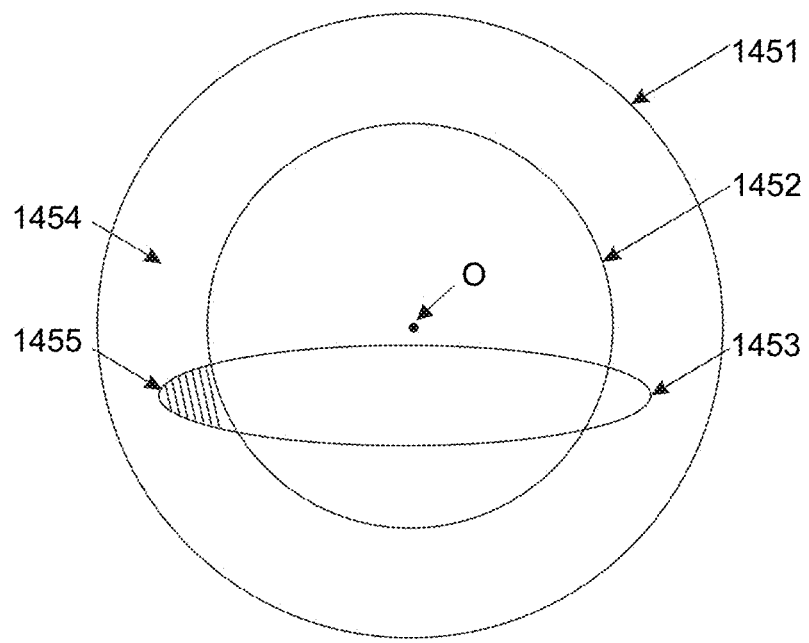
FIG. 14B is a schematic diagram illustrating an exemplary outer ring according to some embodiments of the present disclosure.

As shown in FIG. 14B, the subject 1453 may be located within a gantry bore 1451 of the imaging device 110 when the subject 1453 is imaged by the imaging device 110. The imaging device 110 may have a scanned FOV 1452 in the gantry bore 1451. The scanned FOV 1452 may define the size of a two-dimensional or three-dimensional area of an image. The scanned FOV may include an image area that includes a region of interest (ROI). In some embodiments, if the subject 1453 has a relatively large size, a part of the subject 1453 (e.g., the shaded region 1455) may extend outside the scanned FOV 1452 and into the outer ring 1454. The center of the scanned FOV 1452 and the center of the gantry bore 1451 may coincide at center O. The region between the gantry bore 1451 and the scanned FOV 1452 may be referred to as the outer ring 1454. The center of the outer ring 1454 may be also the center O. In some embodiments, image information (including background information) of the part of the subject 1453 (e.g., the shaded region 1455) in the outer ring 1454 may be used in a plurality of forward projections of an iterative reconstruction to reconstruct an image. In some embodiments, shift may be introduced into the reconstructed image due to the lack of data relating to the part of the subject 1453 in the outer ring 1454. The shift may include a shift of CT value of image background (e.g., air), a deviation of reconstruction of the part of the subject 1453 located in the outer ring (e.g., the shaded region 1455), or the like. In some embodiments, it may be desirable to subtract the outer ring background (i.e., background information in the outer ring 1454) from the seed image to generate a corrected seed image. In some embodiments, the corrected seed image may be generated according to process 1600, and is not be repeated here.

In 1407, the processing device 140 (e.g., the reconstruction module 408) may reconstruct one or more images. In some embodiments, the reconstruction module 408 may reconstruct the one or more images by performing an iterative reconstruction based on the corrected seed image determined in 1405 and the raw data obtained in 1401. In some embodiments, the one or more images may include a 3D image (or an image volume). Each of the one or more images may include a plurality of elements. Each element of the plurality of elements may be a pixel or voxel.

In some embodiments, the iterative reconstruction may include a plurality of forward projections and a plurality of back projections. The corrected seed image may provide an initial image estimate for the one or more images in the iterative reconstruction. A shift in the corrected seed image may be reduced or eliminated by subtracting the outer ring background from the seed image determined in 1403. That is, the corrected seed image may include relatively less shift or no shift. Therefore, the iteration counts of iterative reconstruction based on the corrected seed image may be reduced, which may improve the efficiency of the iterative reconstruction. Additionally, the quality of the one or more images reconstructed may be improved. Exemplary iterative reconstruction algorithms may include an adaptive statistical iterative reconstruction (ASiR), a model based iterative reconstruction (MBiR), an iterative reconstruction in image space (iRIS), a sinogram affirmed iterative reconstruction (SAFIRE), a double model based iterative reconstruction (DMBiR), an adaptive iterative dose reduction (AIDR), IMR, or the like, or any combination thereof.

It should be noted that the above description of the process 1400 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, the seed image generation module 404 may first generate a preliminary image by performing an FBP on the raw data, and determine the seed image by performing a down-sampling on the preliminary image. Alternatively, the seed image generation module 404 may perform a down-sampling on the raw data, and generate the seed image by performing an FBP on the down-sampled raw data. Alternatively, the seed image generation module 404 may select a portion of the raw data that are collected from a portion of the plurality of angles, and generate the seed image by performing an FBP on the selected portion of raw data.

Figure 15:
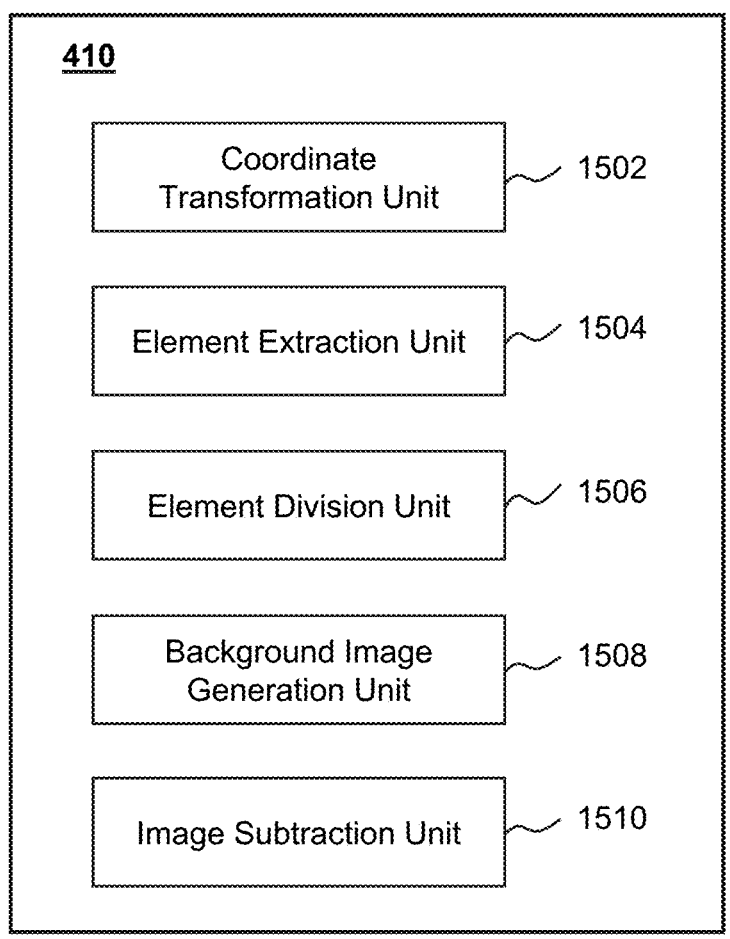
FIG. 15 is a schematic diagram illustrating an exemplary seed image correction module according to some embodiments of the present disclosure.

FIG. 15 is a schematic diagram illustrating an exemplary seed image correction module according to some embodiments of the present disclosure. The seed image correction module 410 may be implemented on the computing device 200 (e.g., the processor 210 as illustrated in FIG. 2 or the CPU 340 as illustrated in FIG. 3). The seed image correction module 410 may include a coordinate transformation unit 1502, an element extraction unit 1504, an element division unit 1506, a background image generation unit 1508, and an image subtraction unit 1510.

The coordinate transformation unit 1502 may be configured to perform a coordinate transformation of an image or elements in the image. Merely by way of example, the coordinate transformation unit 1502 may perform a first coordinate transformation of a seed image from a first coordinate system (e.g., a Cartesian coordinate system) to a second coordinate system (e.g., a polar coordinate system) to determine an intermediate image. The seed image may include a plurality of first elements in the first coordinate system, and the intermediate image may include a plurality of second elements in the second coordinate system. Each first element or second element may be a pixel or voxel. In some embodiments, the intermediate image and the seed image may have substantially the same image information that is expressed in different coordinate systems.

The element extraction unit 1504 may be configured to extract one or more elements from an image. Merely by way of example, the element extraction unit 1504 may extract multiple second elements corresponding to the outer ring from the plurality of second elements in the second coordinate system (i.e., the polar coordinate system). In some embodiments, the element extraction unit 1504 may determine the first maximal polar radius of the scanned FOV and the second maximal polar radius of the gantry bore of the imaging device 110. The element extraction unit 1504 may determine a region between the first maximal polar radius and the second maximal polar radius as the outer ring. The element extraction unit 1504 may extract the multiple second elements located in the outer ring.

The element division unit 1506 may be configured to divide the multiple extracted second elements into a plurality of groups based on locations of the multiple extracted second elements in the second coordinate system. Each group of extracted second elements may correspond to a sub-region of the outer ring. In some embodiments, the element division unit 1506 may divide the multiple extracted second elements into a plurality of groups according to the polar angles of the multiple extracted second elements. In some embodiments, the element division unit 1506 may uniformly or non-uniformly divide the multiple extracted second elements.

The background image generation unit 1508 may be configured to generate a background image corresponding to an outer ring background in the first coordinate system based on the plurality of groups of extracted second elements. In some embodiments, the background image may reflect background information (e.g., air) corresponding to the outer ring. Details regarding the generation of the background image may be found elsewhere in the present disclosure (e.g., operation 1607 of the process 1600, process 1700, and the descriptions thereof).

The image subtraction unit 1510 may be configured to subtract the background image corresponding to the outer ring background from the seed image to obtain a corrected seed image. In some embodiments, the background image may include a plurality of elements reflecting the background information (e.g., element values of air) in the outer ring. In some embodiments, the background image may also be referred to as the outer ring background. The image subtraction unit 1510 may subtract the element values of the outer ring background from the seed image to obtain the corrected seed image. The corrected seed image may include less outer ring background than the original seed image. In some embodiments, the corrected seed image may include no outer ring background.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the seed image correction module 410 may further include a storage unit (not shown in FIG. 15). The storage unit may be configured to store data generated by the unit(s) of the seed image correction module 410.

Figure 16:
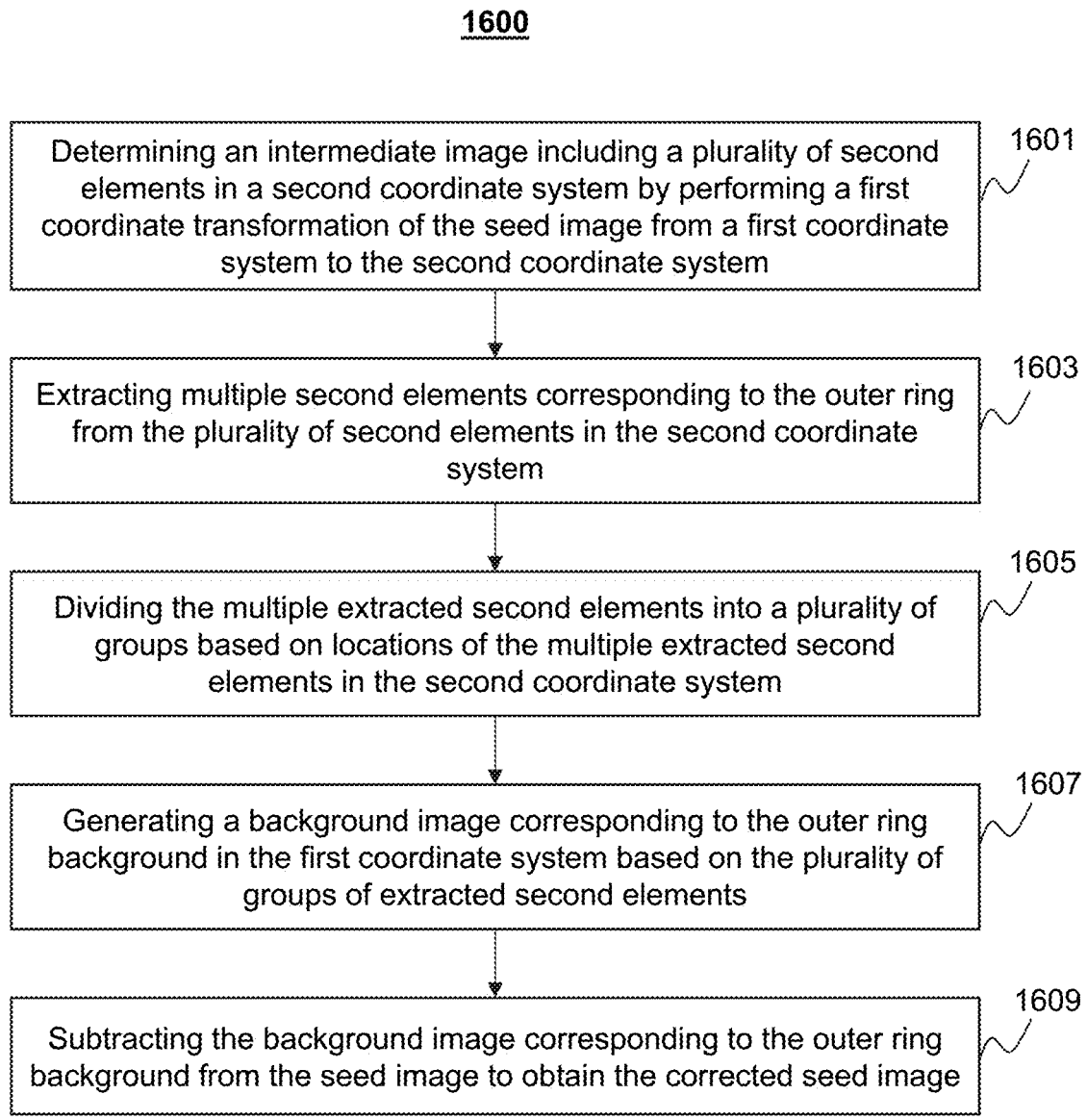
FIG. 16 is a flowchart illustrating an exemplary process for generating a corrected seed image according to some embodiments of the present disclosure.

FIG. 16 is a flowchart illustrating an exemplary process for generating a corrected seed image according to some embodiments of the present disclosure. In some embodiments, one or more operations of process 1600 may be implemented in the imaging system 100 illustrated in FIG. 1. For example, the process 1600 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 1600 may be implemented on the imaging device 110. The operations of the illustrated process presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting. In some embodiments, operation 1405 of process 1400 may be performed according to process 1600.

In 1601, the processing device 140 (e.g., the coordinate transformation unit 1502) may determine an intermediate image based on the seed image. In some embodiments, the seed image may include a plurality of first elements in the first coordinate system. The intermediate image may include a plurality of second elements in a second coordinate system. Each first element may be a pixel or voxel. Each second element may be a pixel or voxel. The coordinate transformation unit 1502 may generate the intermediate image by performing a first coordinate transformation of the seed image from the first coordinate system to the second coordinate system.

In some embodiments, the first coordinate system may be a Cartesian coordinate system, and the second coordinate system may be a polar coordinate system. In some embodiments, the origin of the first coordinate system and/or the origin of the second coordinate system may be located at a position in the gantry bore of the gantry 111. For example, the origin of the first coordinate system and the origin of the second coordinate system may coincide and be both coincide to the center of the outer ring (as shown in FIG. 18).

Figure 18:
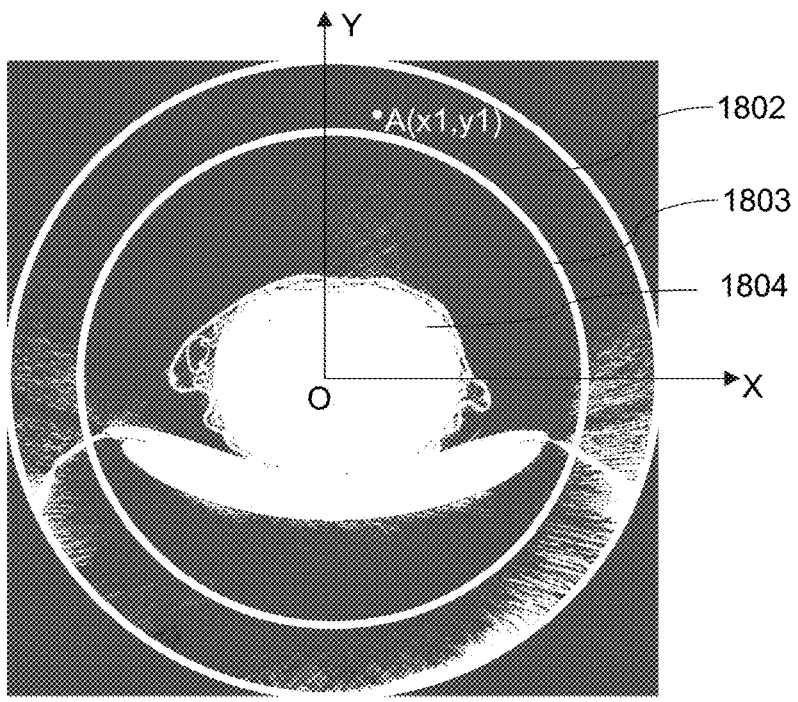
FIG. 18 is a schematic diagram illustrating an exemplary seed image of a subject according to some embodiments of the present disclosure.

FIG. 18 is a schematic diagram illustrating an exemplary seed image of a subject according to some embodiments of the present disclosure. The seed image is a two-dimensional (2D) image. As shown in FIG. 18, an outer ring refers to the region between the gantry bore of the imaging device 110 and the scanned FOV. As illustrated in FIG. 18, the subject 1804 was positioned within the scanned FOV 1803. An outer ring background 1802 includes background information, including air, bed information, or the like, or any combination thereof. The seed image shown in FIG. 18 is illustrated in an orthogonal coordinate system. The horizontal axis of the Cartesian coordinate system is the X-axis in FIG. 18, and the vertical axis of the Cartesian coordinate system is the Y-axis in FIG. 18. The origin O of the Cartesian coordinate system coincides with the center of the outer ring.

Figure 19:
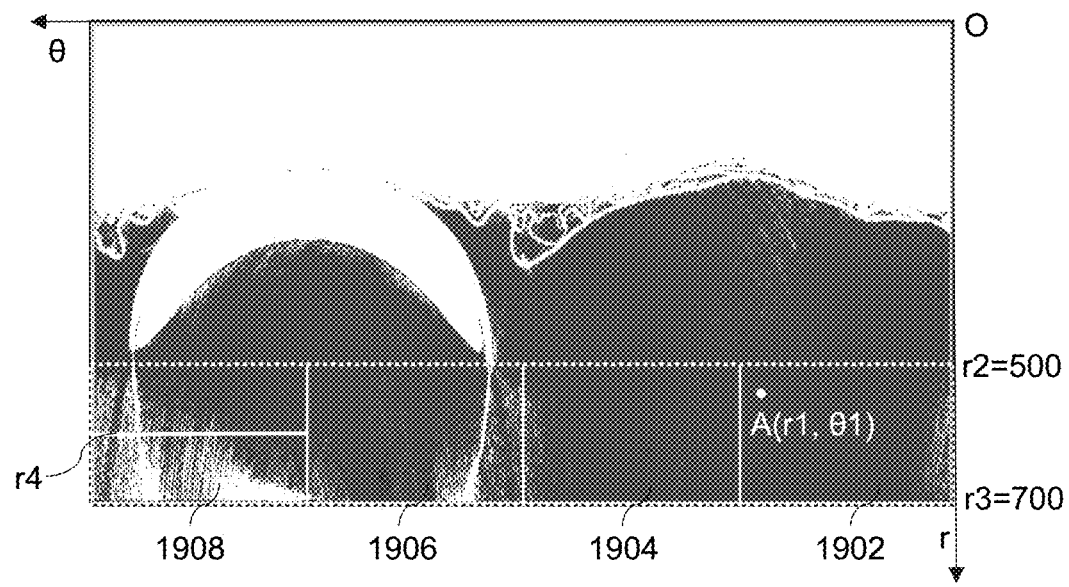
FIG. 19 is a schematic diagram illustrating an exemplary intermediate image of the subject according to some embodiments of the present disclosure.

FIG. 19 is a schematic diagram illustrating an exemplary intermediate image of the subject according to some embodiments of the present disclosure. The intermediate image was determined according to a first coordinate transformation of the seed image illustrated in FIG. 18. The intermediate image shown in FIG. 19 is illustrated in a polar coordinate system. The origin O of the polar coordinate system is also located at the center of the outer ring. The horizontal axis of the polar coordinate system is the polar angle θ in FIG. 19, and the vertical axis of the polar coordinate system is the polar radius r in FIG. 19.

In some embodiments, the intermediate image and the seed image may have substantially the same image information that is expressed in different coordinate systems. In some embodiments, one or more of the second elements in the second coordinate system may not directly correspond to one or more of the first elements in the first coordinate system. For example, a second element may have a corresponding location in the seed image between two first elements (i.e., the corresponding location of the second element may occupy a portion of each of the two first elements). Therefore, in some embodiments, the element value of a second element in the second coordinate system may be determined by interpolation based on element values of two or more first elements in the first coordinate system.

In 1603, the processing device 140 (e.g., the element extraction unit 1504) may extract multiple second elements corresponding to the outer ring from the plurality of second elements in the second coordinate system. In some embodiments, the element extraction unit 1504 may determine a first maximal polar radius of the scanned FOV and a second maximal polar radius of the gantry bore of the imaging device 110. The element extraction unit 1504 may determine a region between the first maximal polar radius and the second maximal polar radius as the outer ring. The element extraction unit 1504 may extract the multiple second elements located in the outer ring. Merely by way of example, as shown in FIG. 19, the maximal polar radius r2 of the scanned FOV may be 500 millimeters, and the maximal polar radius r3 of the gantry bore of the imaging device 110 may be 700 millimeters. The region between r2=500 millimeters and r3=700 millimeters (e.g., the region indicated by dotted lines) may be designated as the outer ring, and accordingly, the multiple second elements in the region may be extracted.

In 1605, the processing device 140 (e.g., the element division unit 1506) may divide the multiple extracted second elements into a plurality of groups based on locations of the multiple extracted second elements in the second coordinate system. Each group of extracted second elements may correspond to a sub-region of the outer ring. In some embodiments, the element division unit 1506 may divide the multiple extracted second elements into a plurality of groups according to the polar angles of the multiple extracted second elements. In some embodiments, the element division unit 1506 may uniformly or non-uniformly divide the multiple extracted second elements. Merely by way of example, as shown in FIG. 19, the multiple extracted second elements corresponding to the outer ring may be uniformly divided into four groups, i.e., a first group, a second group, a third group, and a fourth group. The polar angles of the second elements in the first group may be in the range of 0°-90°, indicating a first sub-region 1902 of the outer ring. The polar angles of the second elements in the second group may be in the range of 90°-180°, indicating a second sub-region 1904 of the outer ring. The polar angles of the second elements in the third group may be in the range of 180°-270°, indicating a third sub-region 1906 of the outer ring. The polar angles of the second elements in the fourth group may be in the range of 270°-360°, indicating a fourth sub-region 1908 of the outer ring. It should be noted that in some embodiments, the multiple extracted second elements may be divided into other numbers (or counts) of groups, for example, 5 groups, 8 groups, 10 groups, or the like. In some embodiments, the multiple extracted second elements may be divided according to one or more patterns that are set according to, e.g., a default setting of the imaging system 100, or preset by a user or operator via the terminal 130.

In 1607, the processing device 140 (e.g., the background image generation unit 1508) may generate a background image corresponding to the outer ring background in the first coordinate system based on the plurality of groups of extracted second elements. In some embodiments, the background image may reflect background information (e.g., air) corresponding to the outer ring.

In some embodiments, the background image generation unit 1508 may determine a plurality of reference values in each sub-region of the outer ring along a first direction (e.g., the radial direction) of the second coordinate system. The background image generation unit 1508 may determine a preliminary circular image including multiple third elements in the first coordinate system by performing a second coordinate transformation of the multiple extracted second elements from the second coordinate system (i.e., the polar coordinate system) to the first coordinate system (i.e., the Cartesian coordinate system). The preliminary circular image may correspond to the outer ring. The background image generation unit 1508 may further modify the preliminary circular image to obtain the background image corresponding to the outer ring background by performing a homogenization operation. In some embodiments, the homogenization operation may include a rotating operation, a superposition operation, and a normalization operation. More descriptions regarding the generation of the background image may be found elsewhere in the present disclosure (e.g., FIGS. 17, 22, and 24, and relevant descriptions thereof).

In 1609, the processing device 140 (e.g., the image subtraction unit 1510) may subtract the background image corresponding to the outer ring background from the seed image to obtain the corrected seed image. In some embodiments, the background image may include a plurality of elements reflecting the background information (e.g., element values of air) in the outer ring. In some embodiments, the background image may also be referred to as the outer ring background. The image subtraction unit 1510 may subtract the element values of the outer ring background from the seed image to obtain the corrected seed image. The corrected seed image may include less outer ring background than the original seed image. In some embodiments, the corrected seed image may include no outer ring background.

It should be noted that the above description of the process 1600 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, operation 1603 and/or operation 1601 may be performed differently. Merely by way of example, the processing device 140 may extract multiple first elements corresponding to the outer ring from the plurality of first elements in the first coordinate system. The processing device 140 may further perform a first coordinate transformation of the multiple extracted first elements from the first coordinate system to the second coordinate system to determine multiple extracted second elements.

In some embodiments, operation 1601 may be omitted, and coordinate transformation may be unnecessary for generating the corrected seed image. Merely by way of example, the processing device 140 may extract multiple elements corresponding to a preliminary circular image of the outer ring and generate one or more rotated circular images by rotating the multiple extracted elements with respect to the center of the outer ring for one or more times and by an angle in each time of rotation. In some embodiments, the angle may be less than 360°. In some embodiments, the processing device 140 may modify at least one of the one or more rotated circular images by interpolation. The processing device 140 may generate a background image corresponding to the outer ring background based on the preliminary circular image and the one or more rotated circular images. For example, the processing device 140 may generate a superposed image by superimposing the preliminary circular image and the one or more rotated circular images, and generate the background image corresponding to the outer ring background by normalizing the superposed image. The processing device 140 may subtract the background image corresponding to the outer ring background from the seed image to obtain the corrected seed image.

Figure 17:
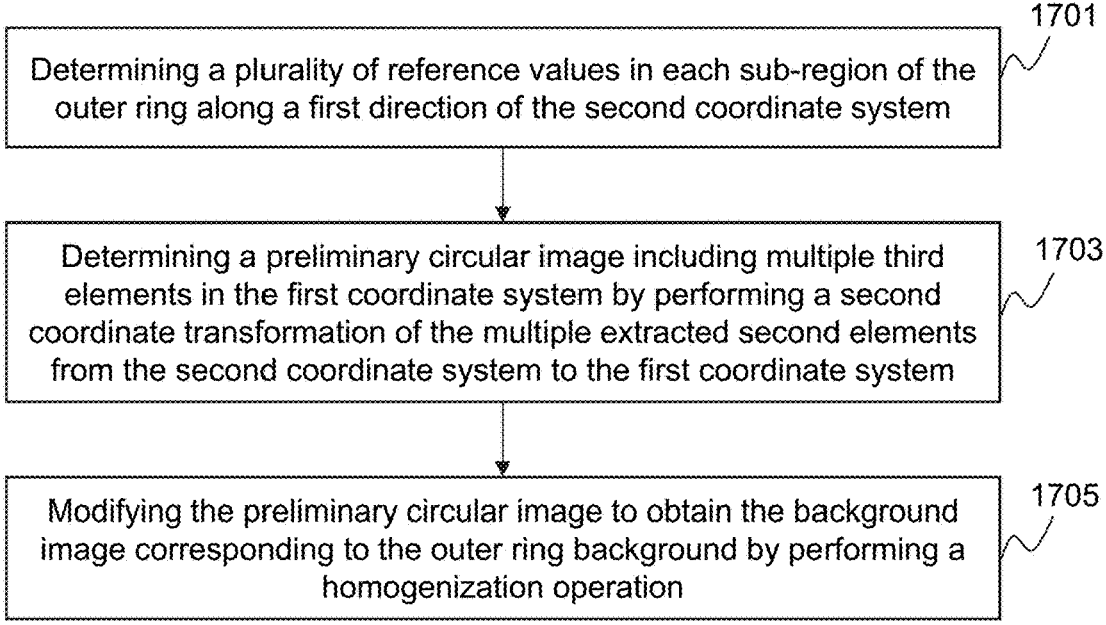
FIG. 17 is a flowchart illustrating an exemplary process for generating a background image according to some embodiments of the present disclosure.

FIG. 17 is a flowchart illustrating an exemplary process for generating a background image according to some embodiments of the present disclosure. In some embodiments, one or more operations of process 1700 may be implemented in the imaging system 100 illustrated in FIG. 1. For example, the process 1700 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 1700 may be implemented on the imaging device 110. The operations of the illustrated process presented below are intended to be illustrative. In some embodiments, the process 1700 may be accomplished with one or more additional operations not described, and/or without one or more of the operations discussed. Additionally, the order in which the operations of the process 1700 as illustrated in FIG. 17 and described below is not intended to be limiting. In some embodiments, operation 1607 of process 1600 may be performed according to process 1700.

Figure 20:
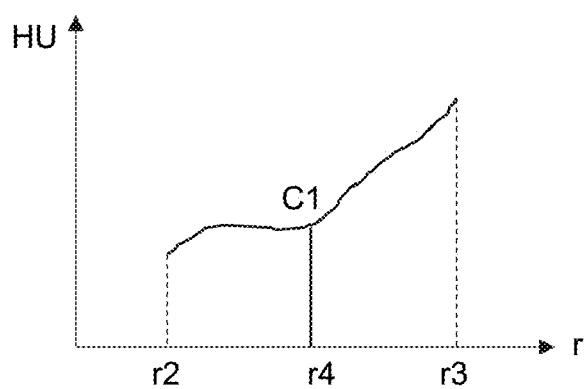
FIG. 20 is a schematic diagram illustrating a plurality of reference values in a plurality of rows in the fourth sub-region.

In 1701, the processing device 140 (e.g., the background image generation unit 1508) may determine a plurality of reference values in each sub-region of the outer ring along a first direction of the second coordinate system. The first direction of the second coordinate system may refer to the radial direction (e.g., the radial direction as illustrated in FIG. 19). In some embodiments, the multiple extracted second elements may be distributed in a plurality of rows along the first direction of the second coordinate system. A reference value may refer to a median value (or an average value, a maximal value, a minimal value, etc.) of element values of extracted second elements in a row of the plurality of rows. Each reference value may correspond to a row of the plurality of rows. Each row may correspond to a certain polar radius (e.g., the polar radius may be within a range of 500-700 millimeters as illustrated in FIG. 19). Therefore, the plurality of reference values and the polar radiuses of the outer ring may have a certain relation as illustrated in FIG. 20.

In some embodiments, for each sub-region of the outer ring and in each row of the plurality of rows, the background image generation unit 1508 may designate a median value of the extracted second elements in the each row of the each sub-region as a reference value of the each row of the each sub-region. The median value (also referred to as middle value) may be a value separating the higher half of element values of the extracted second elements in the each row of the each sub-region from the lower half thereof. Merely by way of example, if there are five element values (e.g., a first element value, a second element value, a third element value, a fourth element value, a fifth element value) ranked from small to large (or from large to small), the third element value may be the median value. In some embodiments, the number (or count) of the extracted second elements indicating background information may exceed the number (or count) of the extracted second elements indicating information related to the subject, and the median value may be an element value of background information. Merely by way of example, as shown in FIG. 19, for the fourth sub-region 1908 and in row r4, the background image generation unit 1508 may sequence the extracted second elements in the row r4 of the fourth sub-region 1908 according to the corresponding element values. The background image generation unit 1508 may determine a median value of the extracted second elements based on the sequenced extracted second elements, and designate the median value as the reference value of the row r4 of the fourth sub-region 1908 (e.g., the element value C1 as illustrated in FIG. 20). FIG. 20 is a schematic diagram illustrating a plurality of reference values in a plurality of rows in the fourth sub-region 1908. As shown in FIG. 20, each reference value may correspond to a row. Each reference value may be a median value of the extracted second elements in the row of the fourth sub-region 1908. For example, reference value C1 may be a median value of the extracted second elements in the row r4 of the fourth sub-region 1908.

Alternatively or additionally, for each sub-region of the outer ring and in each row of the plurality of rows, the background image generation unit 1508 may determine a portion of the extracted second elements in the each row of the each sub-region. The portion of the extracted second elements may have element values within a certain range. The element values within the certain range may indicate background information, such as air. Merely by way of example, for a sub-region of the outer ring and in a row of the plurality of rows, the background image generation unit 1508 may determine whether an element value of an extracted second element in the row of the sub-region is within the certain range. In response to a determination that the element value of the extracted second element in the row of the sub-region is beyond the certain range (i.e., the extracted second element may indicate information related to the subject), the background image generation unit 1508 may not take the extracted second element into account in the determination of the reference value(s). In response to a determination that the element value of the extracted second element in the row of the sub-region is within the certain range (i.e., the extracted second element may indicate background information (e.g., air)), the background image generation unit 1508 may take the extracted second element into account in the determination of the reference value(s). The background image generation unit 1508 may determine a portion of the extracted second elements (i.e., one or more extracted second elements of which element values are within the certain range) in the each row of the each sub-region based on the determination results, and determine an average value of the element values of the potion of the extracted second elements. The background image generation unit 1508 may designate the average value of the portion of the extracted second elements as a reference value of the each row of the each sub-region.

In 1703, the processing device 140 (e.g., the background image generation unit 1508) may determine a preliminary circular image including multiple third elements in the first coordinate system by performing a second coordinate transformation of the multiple extracted second elements from the second coordinate system (i.e., the polar coordinate system) to the first coordinate system (i.e., the Cartesian coordinate system). In some embodiments, the preliminary circular image may correspond to the outer ring. In some embodiments, one or more of the element values of the multiple third elements may be determined based on the plurality of reference values, and be different from that of the corresponding first elements in the seed image.

Figure 21A:
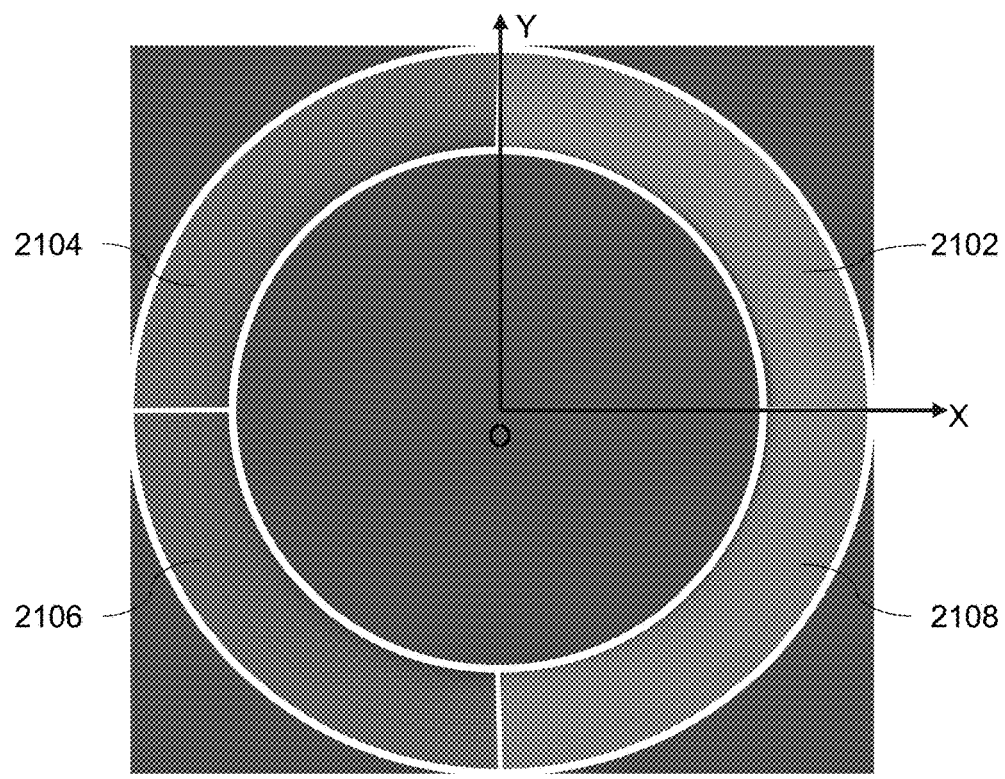
FIG. 21A is a schematic illustrating an exemplary preliminary circular image according to some embodiments of the present disclosure.

Merely by way of example, FIG. 21A is a schematic diagram illustrating an exemplary preliminary circular image according to some embodiments of the present disclosure. The preliminary circular image may be generated according to a second coordinate transformation of multiple extracted second elements. As shown in FIG. 21A, the preliminary circular image may include four portions, i.e., a first portion 2102, a second portion 2104, a third portion 2106, and a fourth portion 2108. The first portion 2102 may correspond to the first sub-region 1902. The second portion 2104 may correspond to the second sub-region 1904. The third portion 2106 may correspond to the third sub-region 1906. The fourth portion 2108 may correspond to the fourth sub-region 1908. The preliminary circular image may include a plurality of third elements. The element values of the third elements in each portion may be determined based on a plurality of reference values in the corresponding sub-region. For example, the element values of the third elements in the first portion 2102 may be determined based on a plurality of reference values in the first sub-region 1902 of the outer ring.

In some embodiments, after the second coordinate transformation, a first portion of the third elements in the preliminary circular image may directly correspond to a portion of the extracted second elements in the intermediate image, and each element value of the first portion of the third elements may be directly determined according to the relation between the reference values and the polar radiuses (as illustrated in FIG. 20), and accordingly, a reference value may be designated as the each element value of the first portion of the third elements. Alternatively or additionally, a second portion of the third elements in the preliminary circular image may not directly correspond to any extracted second element in the intermediate image, and each element value of the second portion of the third elements may be determined by interpolation based on the relation between the reference values and the polar radiuses (as illustrated in FIG. 20). Therefore, in some embodiments, the background image generation unit 1508 may perform interpolation for a portion of the transformed extracted second elements based on the plurality of reference values to determine the element values of the third elements. The interpolation algorithm may include a nearest pixel interpolation, a linear interpolation, or the like.

Figure 21B:
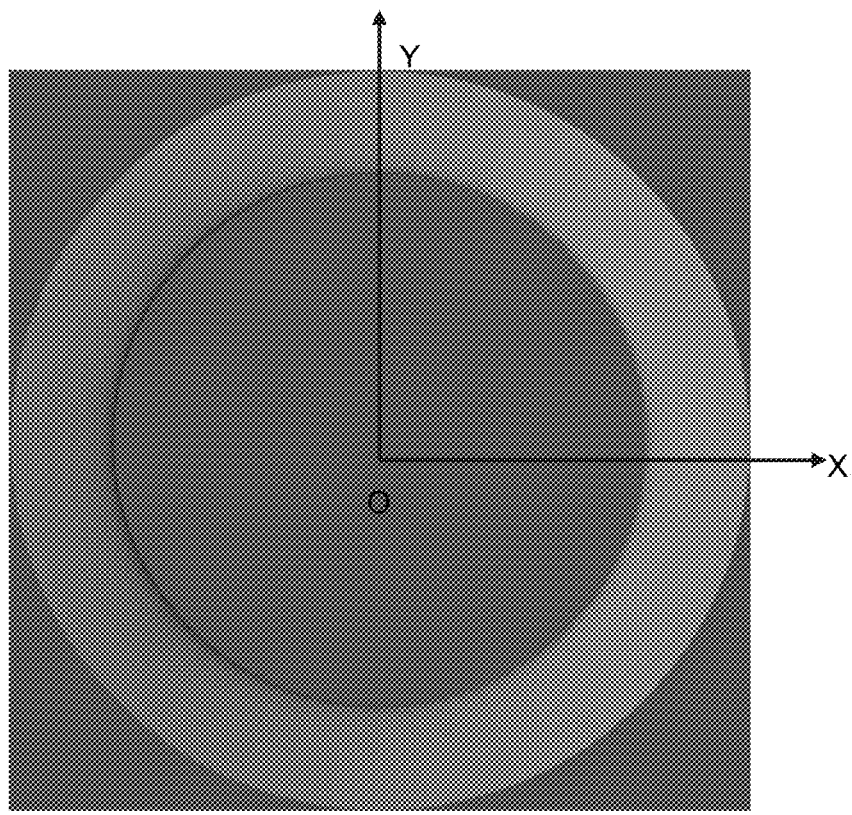
FIG. 21B is a schematic diagram illustrating an exemplary background image according to some embodiments of the present disclosure.

In 1705, the processing device 140 (e.g., the background image generation unit 1508) may modify the preliminary circular image to obtain the background image corresponding to the outer ring background by performing a homogenization operation. The background image may reflect background information (e.g., air) related to the outer ring. FIG. 21B is a schematic diagram illustrating an exemplary background image according to some embodiments of the present disclosure. The background image shown in FIG. 21B is generated by modifying the preliminary circular image illustrated in FIG. 21A. As shown in FIG. 21B, the background image is more homogeneous than the preliminary circular image in FIG. 21A.

In some embodiments, the homogenization operation may include a rotating operation, a superposition operation, a normalization operation, or the like, or a combination thereof. For example, the background image generation unit 1508 may generate one or more rotated circular images by rotating the multiple third elements of the preliminary circular image with respect to a center of the outer ring for one or more times and by an angle in each time of rotation. By performing the rotation operation, the reference value (e.g., the median value) may be spread uniformly across the rotated images in the radial direction. Merely by way of example, when the multiple third elements of the preliminary circular image are rotated for one time, the positions of the multiple third elements may be moved to new positions to generate a rotated circular image. For a third element of the preliminary circular image located at a first position, the element value of a corresponding element located at the first position in the rotated circular image may be different from the element value of the third element of the preliminary circular image. The background image generation unit 1508 may generate a superposed image by superimposing the preliminary circular image and the one or more rotated circular images. The background image generation unit 1508 may further generate the background image corresponding to the outer ring background by normalizing the superposed image. For example, the background image generation unit 1508 may divide each element (also referred as fourth element) in the superposed image by n+1, in which n refers to the times of rotation or the number (or count) of rotated circular images. As another example, the background image generation unit 1508 may rotate the multiple third elements of the preliminary circular image for one or more times. In each time of rotation, the background image generation unit 1508 may generate a rotated circular image upon rotating the multiple third elements of the preliminary circular image with respect to a center of the outer ring by an angle, and generate another image by superimposing the preliminary circular image and the rotated circular image. In each time of rotation, the background image generation unit 1508 may also designate the superposed image as the preliminary circular image. When the one or more times of rotation is finished, the background image generation unit 1508 may generate the background image corresponding to the outer ring background by normalizing the superposed image. For example, the background image generation unit 1508 may divide each element (i.e., fourth element) in the superposed image by $2^n$ (n refers to the times of rotation) to generate the background image. More descriptions regarding the generation of the background image may be found elsewhere in the present disclosure (e.g., FIGS. 22 and 24, and the relevant descriptions thereof).

FIG. 22 is a flowchart illustrating an exemplary process for modifying a preliminary circular image according to some embodiments of the present disclosure. In some embodiments, one or more operations of process 2200 may be implemented in the imaging system 100 illustrated in FIG. 1. For example, the process 2200 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 2200 may be implemented on the imaging device 110. The operations of the illustrated process presented below are intended to be illustrative. In some embodiments, the process 2200 may be accomplished with one or more additional operations not described, and/or without one or more of the operations discussed. Additionally, the order in which the operations of the process 2200 as illustrated in FIG. 22 and described below is not intended to be limiting. In some embodiments, operation 1705 of process 1700 may be performed according to process 2200.

In 2201, the processing device 140 (e.g., the background image generation unit 1508) may generate one or more rotated circular images by rotating the multiple third elements of the preliminary circular image with respect to a center of the outer ring for one or more times and by an angle in each time of rotation. Each rotated circular image may include multiple rotated third elements. The center of the outer ring may coincide with the center of the scanned FOV and/or the gantry bore of the imaging device 110. The angle may be less than 360°. In some embodiments, the angle in two or more times of rotation may be the same. Alternatively, the angle in different times of rotation may be different. For example, the angle in a first time of rotation may be 30°, and the angle in a second time of rotation may be 45°. The times of rotation may be set according to, e.g., a default setting of the imaging system 100, or preset by a user or operation via the terminal 130.

Figure 23:
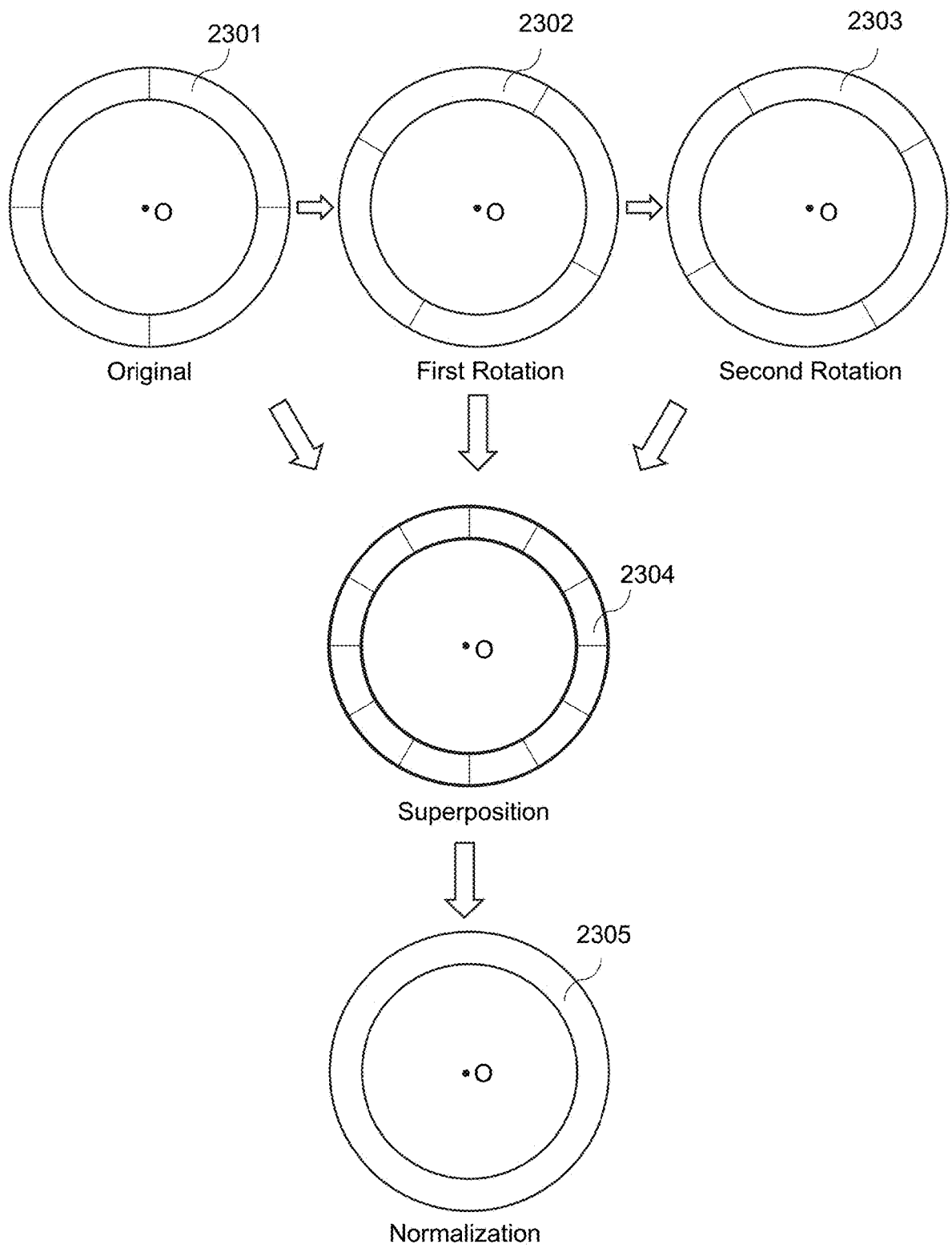
FIG. 23 is a schematic diagram illustrating an exemplary process for modifying a preliminary circular image according to some embodiments of the present disclosure.

One or more rotated circular images may be generated based on the preliminary circular image, as illustrated in FIG. 23. FIG. 23 is a schematic diagram illustrating an exemplary process for modifying a preliminary circular image according to some embodiments of the present disclosure. As shown in FIG. 23, the preliminary circular image 2301 may include four portions. A first rotated circular image 2302 may be generated by rotating the preliminary circular image 2301 with respect to the center O of the outer ring with an angle 30° for the first rotation. A second rotated circular image 2303 may be generated by rotating the preliminary circular image 2301 with respect to the center O of the outer ring with an angle 60° for the second rotation (or, rotating the first rotated circular image 2302 with respect to the center O of the outer ring with an angle 30° for the second rotation). It should be noted that the times of rotation is merely provided for the purposes of illustration, and is not intended to limit the scope of the present disclosure. The preliminary circular image 2301 may be rotated for other times of rotation, for example, 7 times, 10 times, 20 times, or the like. The rotations of the preliminary circular image may be in a same direction (e.g., a clockwise direction, a counterclockwise direction).

In 2203, the processing device 140 (e.g., the background image generation unit 1508) may generate a new image (i.e., a superposed image) by superimposing the preliminary circular image and the one or more rotated circular images. In some embodiments, the background image generation unit 1508 may superimpose the third elements in the preliminary circular image and the corresponding rotated third elements in the one or more rotated circular images. The superposed image may include multiple fourth elements. Each fourth element may be the sum of a third element and the corresponding rotated third elements. Merely by way of example, as shown in FIG. 23, a new image 2304 may be generated by superimposing the preliminary circular image 2301, the first rotated circular image 2302 and the second rotated circular image 2303.

In some embodiments, the background image generation unit 1508 may first perform an interpolation operation for at least one of the one or more rotated circular images. Specifically, the background image generation unit 1508 may perform the interpolation operation for the rotated third elements of at least one rotated circular image. The background image generation unit 1508 may generate a new image (i.e., a superposed image) by superimposing the preliminary circular image and the one or more (interpolated) rotated circular images.

In 2205, the processing device 140 (e.g., the background image generation unit 1508) may generate the background image corresponding to the outer ring background by normalizing the superposition image. The background image may reflect background information (e.g., air) related to the outer ring.

In some embodiments, the background image generation unit 1508 may divide each fourth element in the superposed image by n+1 (n refers to the times of rotation, or the number (or count) of rotated circular images). For example, if a superposed image is generated based on a preliminary circular image and 6 rotated circular images, the background image generation unit 1508 may divide each fourth element in the superposed image by 7 to generate the background image. As another example, as shown in FIG. 23, the superposed image 2304 may be generated based on the preliminary circular image 2301, the first rotated circular image 2302, and the second rotated circular image 2303. A background image 2305 may be generated by dividing the superposed image 2304 (e.g., the fourth elements in the superposed image 2304) by 3.

Figure 24:
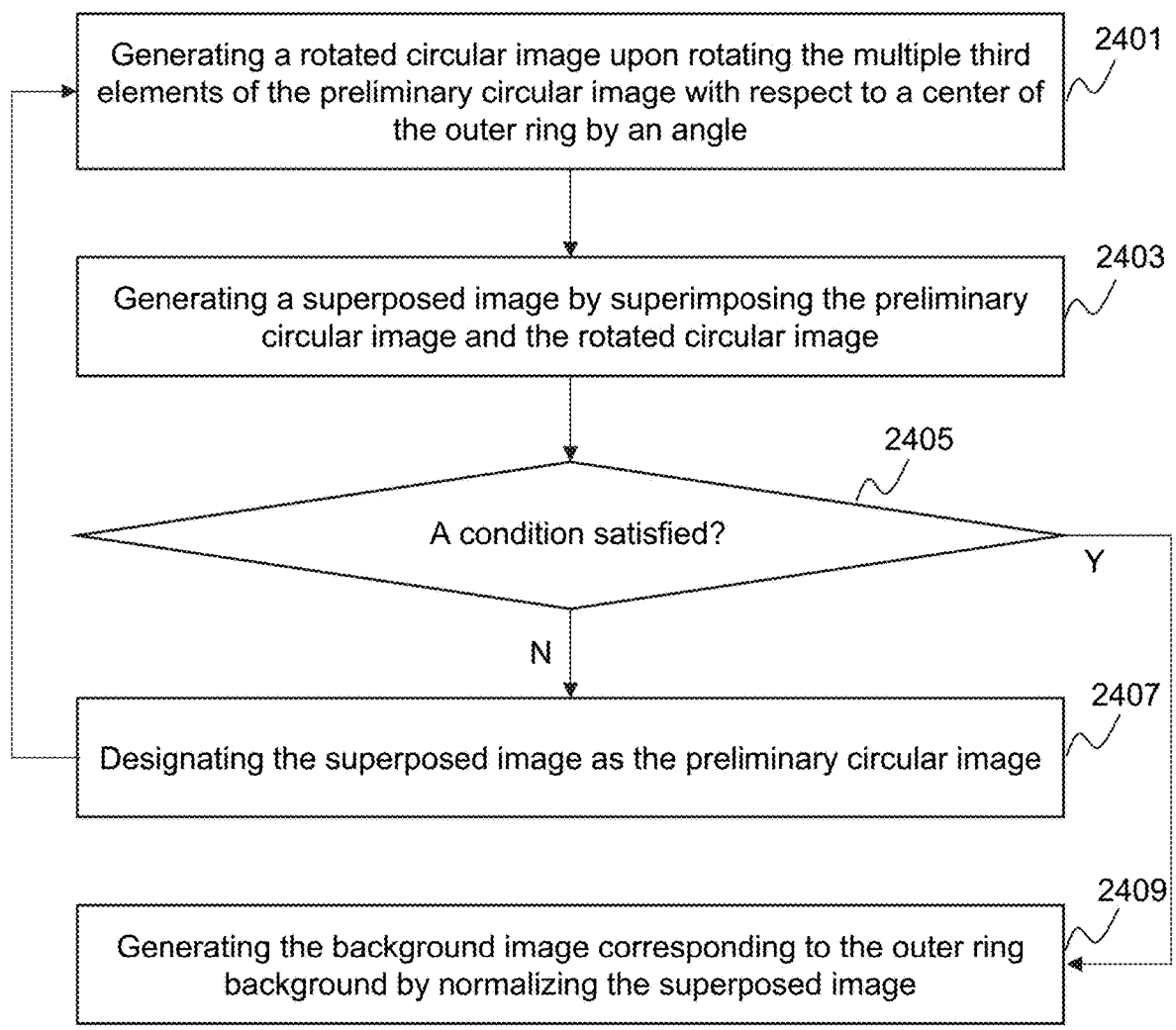
FIG. 24 is a flowchart illustrating an exemplary process for modifying a preliminary circular image according to some embodiments of the present disclosure.

FIG. 24 is a flowchart illustrating an exemplary process for modifying a preliminary circular image according to some embodiments of the present disclosure. In some embodiments, one or more operations of process 2400 may be implemented in the imaging system 100 illustrated in FIG. 1. For example, the process 2400 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 4, or the like). As another example, a portion of the process 2400 may be implemented on the imaging device 110. The operations of the illustrated process presented below are intended to be illustrative. In some embodiments, the process 2400 may be accomplished with one or more additional operations not described, and/or without one or more of the operations discussed. Additionally, the order in which the operations of the process 2400 as illustrated in FIG. 24 and described below is not intended to be limiting. In some embodiments, operation 1705 of process 1700 may be performed according to process 2400.

In 2401, the processing device 140 (e.g., the background image generation unit 1508) may generate a rotated circular image upon rotating the multiple third elements of the preliminary circular image with respect to a center of the outer ring by an angle. The rotated circular image may include multiple rotated third elements. The center of the outer ring may be located at the center of the scanned FOV and/or the gantry bore of the imaging device 110. The angle may be less than 360°.

In 2403, the processing device 140 (e.g., the background image generation unit 1508) may generate a new image (i.e., a superposed image) by superimposing the preliminary circular image and the rotated circular image. In some embodiments, the background image generation unit 1508 may superimpose the third elements in the preliminary circular image and the corresponding rotated third elements in the rotated circular image. The superposed image may include multiple fourth elements. Each fourth element may be the sum of a corresponding third element and a corresponding rotated third element.

In some embodiments, the background image generation unit 1508 may first perform an interpolation operation for the rotated circular image. Specifically, the background image generation unit 1508 may perform the interpolation operation for the rotated third elements of the rotated circular image. The background image generation unit 1508 may generate a new image (i.e., a superposed image) by superimposing the preliminary circular image and the interpolated rotated circular image.

In 2405, the processing device 140 (e.g., the background image generation unit 1508) may determine whether a condition is satisfied. The condition may be associated with whether specified times of rotation are performed, whether the difference between two superposed images in two consecutive times is less than a threshold, or the like, or a combination thereof. It should be noted that, in some embodiments, when the difference between two superposed images in two consecutive times is equal to the threshold, the background image generation unit 1508 may determine that the condition is satisfied. As another example, the background image generation unit 1508 may determine that the condition is not satisfied. In response to a determination that the condition is not satisfied, the process 2400 may proceed to 2407. In 2407, the processing device 140 (e.g., the background image generation unit 1508) may designate the superposed image as the preliminary circular image. The process 2400 may further proceed to 2401 and perform a next time of rotation. In some embodiments, the rotation angle in different times of rotation may be the same or different.

In response to a determination that the condition is satisfied, the process 2400 may proceed to 2409. In 2409, the processing device 140 (e.g., the background image generation unit 1508) may generate the background image corresponding to the outer ring background by normalizing the superposed image. The background image may reflect background information (e.g., air) related to the outer ring.

In some embodiments, the background image generation unit 1508 may divide each fourth element in the superposed image by $2^n$ (n refers to the times of rotation) to generate the background image. For example, if a superposed image may be generated by performing 6 times of rotation, the background image generation unit 1508 may divide each fourth element in the superposed image by $2^6$ to generate the background image.

Figure 25:
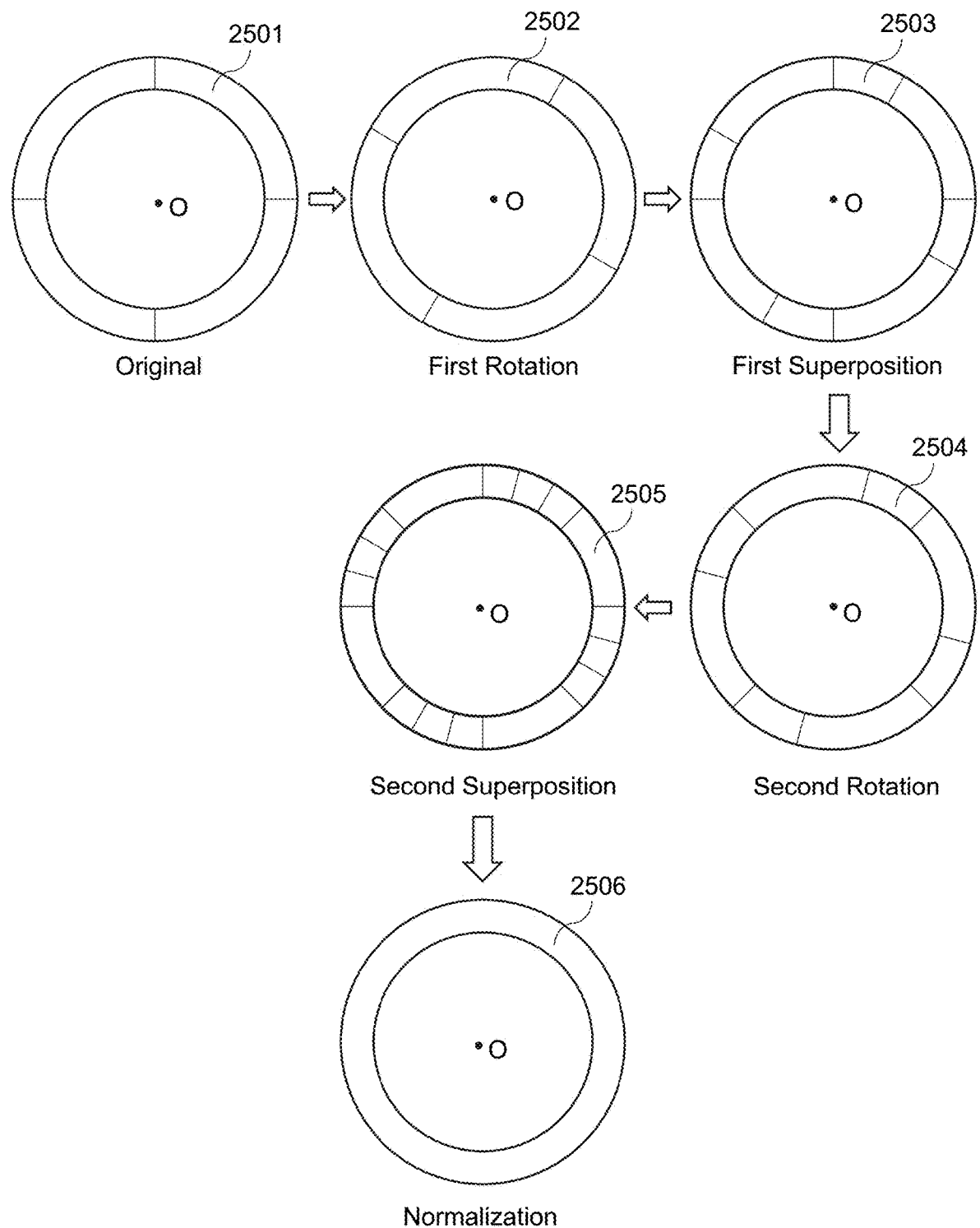
FIG. 25 is a schematic diagram illustrating an exemplary process for modifying a preliminary circular image according to some embodiments of the present disclosure.

FIG. 25 is a schematic diagram illustrating an exemplary process for modifying a preliminary circular image according to some embodiments of the present disclosure. As shown in FIG. 25, two times of rotation may be performed. A preliminary circular image 2501 may include four portions. A first rotated circular image 2502 may be generated by rotating the preliminary circular image 2501 with respect to the center O of the outer ring by an angle 30° for the first rotation. A first new image (i.e., a first superposed image) 2503 may be generated by superimposing the preliminary circular image 2501 and the rotated circular image 2502. The first superposed image 2503 may be regarded as the preliminary circular image 2501 in a next rotation. A second rotated circular image 2504 may be generated by rotating the first superposed image 2503 with respect to the center O of the outer ring by an angle 15° for the second rotation. A second new image (i.e., a second superposed image) 2505 may be generated by superimposing the first superposed image 2503 and the second rotated circular image 2504. A background image 2506 may be generated by normalizing the second superposed image 2505. Specifically, the background image 2506 may be generated by dividing the second superposed image 2505 (e.g., the fourth elements in the second superposed image 2505) by 4. That is, in FIG. 25, a radial moving average is applied to the four-sector image.

The present disclosure provides systems and methods for iterative reconstruction based on an air mask. With the first air mask, the iterative reconstruction may be accelerated. Specifically, the air mask may be a binary image, which can distinguish elements representing air and elements not representing air (e.g., elements representing non-air) in an image. The elements representing air in the image may not participate in the iterative reconstruction, which may accelerate the speed of the iterative reconstruction. Thus, an air mask with high accuracy of distinguishing air and non-air may facilitate the iterative reconstruction and improve the quality of reconstructed images. In the present disclosure, the air mask may be generated by performing minimum value BP (described elsewhere in the present disclosure) on raw data. By performing the minimum value BP, an air mask seed image (also referred to as second seed image) may be first generated. Whether truncations are introduced in the reconstruction or not, the air mask seed image generated based on the minimum value BP can provide a clear outline of a subject, which may facilitate the segmentation or differentiation of air region from the rest of the image by thresholding to generate an air mask. Thus, using minimum value BP, the accuracy of the air mask may be improved.

To accelerate the iterative reconstruction, the present disclosure provides a corrected seed image. The (corrected) seed image may provide an initial image estimate for the iterative reconstruction. In general, a seed image may include a shift due to the lack of data in the outer ring (described elsewhere in the present disclosure). The shift may be reduced or eliminated by increasing the iteration count of iterative reconstruction. In the present disclosure, the seed image may be corrected by subtracting outer ring background from the seed image to reduce or eliminate the shift. Therefore, an initial image estimate with good quality (i.e., the corrected seed image) may be determined. The iteration counts of iterative reconstruction based on the corrected seed image may be reduced, which may improve the efficiency of the iterative reconstruction. The quality of reconstructed images may also be improved.

It should be noted that, in some embodiments, the corrected seed image and the air mask may be simultaneously used in the iterative reconstruction, which may further accelerate the iterative reconstruction and improve the quality of reconstructed images. Merely by way of example, the processing device 140 may reconstruct one or more images based on the corrected seed image, the first air mask, and/or the raw data.

It should be noted that the terms "first," "second," "third," "fourth," etc. are only for ease of description and do not represent a particular order or name.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.

NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine each of which has at least one processor and at least one storage device for reconstructing one or more images, the method comprising:
   obtaining raw data detected by an imaging device;
   generating a seed image by performing a filtered back projection on the raw data;
   determining a corrected seed image by subtracting an outer ring background from the seed image, the outer ring background indicating a background of an outer ring, the outer ring corresponding to a region between a field of view (FOV) of the imaging device and a gantry bore of the imaging device; and
   reconstructing one or more images by performing an iterative reconstruction based on the corrected seed image and the raw data.

2. The method of claim 1, wherein the seed image includes a plurality of first elements in a Cartesian coordinate system, each first element being a pixel or voxel, and the determining a corrected seed image by subtracting an outer ring background from the seed image comprises:
   determining an intermediate image including a plurality of second elements in a polar coordinate system by performing a first coordinate transformation of the seed image from the Cartesian coordinate system to the polar coordinate system;
   extracting, from the plurality of second elements in the polar coordinate system, multiple second elements corresponding to the outer ring;
   dividing, based on locations of the multiple extracted second elements in the polar coordinate system, the multiple extracted second elements into a plurality of groups, each group of extracted second elements corresponding to a sub-region of the outer ring;
   generating a background image corresponding to the outer ring background in the Cartesian coordinate system based on the plurality of groups of extracted second elements; and
   subtracting the background image corresponding to the outer ring background from the seed image to obtain the corrected seed image.

3. The method of claim 2, wherein the generating a background image corresponding to the outer ring background in the Cartesian coordinate system based on the plurality of groups of extracted second elements comprises:

determining a plurality of reference values in each sub-region of the outer ring along a radial direction of the polar coordinate system;

determining a preliminary circular image including multiple third elements in the Cartesian coordinate system by performing a second coordinate transformation of the multiple extracted second elements from the polar coordinate system to the Cartesian coordinate system, the preliminary circular image corresponding to the outer ring; and modifying the preliminary circular image to obtain the background image corresponding to the outer ring background by performing a homogenization operation.

4. The method of claim 3, wherein the performing a second coordinate transformation of the multiple extracted second elements from the polar coordinate system to the Cartesian coordinate system further comprises:

performing, based on the plurality of reference values, interpolation for the multiple transformed extracted second elements.

5. The method of claim 3, wherein the multiple extracted second elements are distributed in a plurality of rows along the radial direction of the polar coordinate system, and the determining a plurality of reference values in each sub-region of the outer ring along the radial direction of the polar coordinate system comprises:

for each sub-region of the outer ring and in each row of the plurality of rows,
designating a median value of the extracted second elements in the each row of the each sub-region as a reference value of the each row of the each sub-region; or
determining a portion of the extracted second elements in the each row of the each sub-region, and designating an average value of the portion of the extracted second elements as a reference value of the each row of the each sub-region, the portion of the extracted second elements having element values within a certain range.

6. The method of claim 3, wherein the modifying the preliminary circular image to obtain the background image corresponding to the outer ring background by performing a homogenization operation comprises:

generating one or more rotated circular images by rotating the multiple third elements of the preliminary circular image with respect to a center of the outer ring for one or more times and by an angle in each time of rotation;
generating a superposed image by superimposing the preliminary circular image and the one or more rotated circular images; and
generating the background image corresponding to the outer ring background by normalizing the superposed image.

7. The method of claim 6, further comprising:
performing an interpolation operation for at least one of the one or more rotated circular images before generating the superposed image.

8. The method of claim 3, wherein the modifying the preliminary circular image to obtain the background image corresponding to the outer ring background by performing a homogenization operation comprises:

rotating the multiple third elements of the preliminary circular image for one or more times, wherein in each time of rotation,
generating a rotated circular image upon rotating the multiple third elements of the preliminary circular image with respect to a center of the outer ring by an angle;
generating a superposed image by superimposing the preliminary circular image and the rotated circular image; and
designating the superposed image as the preliminary circular image; and
generating the background image corresponding to the outer ring background by normalizing the superposed image.

9. The method of claim 8, further comprising:
performing an interpolation operation for at least one of the one or more rotated circular images before generating the superposed image.

10. The method of claim 1, wherein the generating a seed image comprises:
generating a preliminary image by performing a filtered back projection on the raw data; and
determining the seed image by performing a down-sampling on the preliminary image.

11. The method of claim 1, wherein the generating a seed image comprises:
performing a down-sampling on the raw data; and
generating the seed image by performing a filtered back projection on the down-sampled raw data.

12. The method of claim 1, wherein the raw data are collected from a plurality of angles, and the generating a seed image comprises:
selecting, from the raw data, a portion of the raw data that are collected from a portion of the plurality of angles; and
generating the seed image by performing a filtered back projection on the selected portion of the raw data.

13. The method of claim 1, wherein the seed image includes a plurality of elements, each element of the plurality of elements being a pixel or voxel, and the determining a corrected seed image by subtracting an outer ring background from the seed image comprises:
extracting, from the plurality of elements, multiple elements corresponding to a preliminary circular image of the outer ring;
generating one or more rotated circular images by rotating the multiple extracted elements with respect to a center of the outer ring for one or more times and by an angle in each time of rotation, the angle being less than 360°;
generating a background image corresponding to the outer ring background based on the preliminary circular image and the one or more rotated circular images; and
subtracting the background image corresponding to the outer ring background from the seed image to obtain the corrected seed image.

14. The method of claim 13, wherein the generating a background image of the outer ring background based on the preliminary circular image and the one or more rotated circular image comprises:
generating a superposed image by superimposing the preliminary circular image and the one or more rotated circular images; and
generating the background image corresponding to the outer ring background by normalizing the superposed image.

15. The method of claim 13, further comprising:
modifying at least one of the one or more rotated circular images by interpolation.

16. A system comprising:
at least one processor; and
a storage configured to store instructions, wherein when executing the instructions, the at least one processor is configured to cause the system to:
   obtain raw data detected by an imaging device;
   generate a seed image by performing a filtered back projection on the raw data;
   determine a corrected seed image by subtracting an outer ring background from the seed image, the outer ring background indicating a background of an outer ring, the outer ring corresponding to a region between a field of view (FOV) of the imaging device and a gantry bore of the imaging device; and
   reconstruct one or more images by performing an iterative reconstruction based on the corrected seed image and the raw data.

17. The system of claim 16, wherein the seed image includes a plurality of first elements in a Cartesian coordinate system, each first element being a pixel or voxel, and to determine the corrected seed image by subtracting the outer ring background from the seed image, the at least one processor is configured to cause the system to:
   determine an intermediate image including a plurality of second elements in a polar coordinate system by performing a first coordinate transformation of the seed image from the Cartesian coordinate system to the polar coordinate system;
   extract, from the plurality of second elements in the polar coordinate system, multiple second elements corresponding to the outer ring;
   divide, based on locations of the multiple extracted second elements in the polar coordinate system, the multiple extracted second elements into a plurality of groups, each group of extracted second elements corresponding to a sub-region of the outer ring;
   generate a background image corresponding to the outer ring background in the Cartesian coordinate system based on the plurality of groups of extracted second elements; and
   subtract the background image corresponding to the outer ring background from the seed image to obtain the corrected seed image.

18. The system of claim 16, wherein to generate the seed image, the at least one processor is configured to cause the system to:
   generate a preliminary image by performing a filtered back projection on the raw data; and
   determine the seed image by performing a down-sampling on the preliminary image.

19. The system of claim 16, wherein to generate the seed image, the at least one processor is configured to cause the system to:
   perform a down-sampling on the raw data; and
   generate the seed image by performing a filtered back projection on the down-sampled raw data.

20. A non-transitory computer readable medium storing instructions, the instructions, when executed by at least one processor, causing the at least one processor to implement a method comprising:
   obtaining raw data detected by an imaging device;
   generating a seed image by performing a filtered back projection on the raw data;
   determining a corrected seed image by subtracting an outer ring background from the seed image, the outer ring background indicating a background of an outer ring, the outer ring corresponding to a region between a field of view (FOV) of the imaging device and a gantry bore of the imaging device; and
   reconstructing one or more images by performing an iterative reconstruction based on the corrected seed image and the raw data.

\* \* \* \* \*